United States Patent [19]

Tazaki et al.

[11] 4,313,684
[45] Feb. 2, 1982

[54] RECORDING APPARATUS

[75] Inventors: Shigemitsu Tazaki, Matsudo; Shigeru Okamura; Hiroshi Kyogoku, both of Yokohama, all of Japan

[73] Assignee: Canon Kabushiki Kaisha, Tokyo, Japan

[21] Appl. No.: 133,141

[22] Filed: Mar. 24, 1980

[30] Foreign Application Priority Data

Apr. 2, 1979 [JP] Japan .................................. 54-39476

[51] Int. Cl.³ ...................... B41J 19/00; G01D 15/18
[52] U.S. Cl. ................................... 400/322; 400/126; 346/75; 346/140 R
[58] Field of Search ............. 346/75, 140 PD, 140 IJ; 400/1-15, 322

[56] References Cited

U.S. PATENT DOCUMENTS

| | | | |
|---|---|---|---|
| 3,970,183 | 7/1976 | Robinson et al. | 400/323 X |
| 4,044,882 | 8/1977 | Weinke et al. | 400/322 X |
| 4,067,430 | 1/1978 | Wienhold | 400/322 X |
| 4,075,636 | 2/1978 | Galetto et al. | 346/75 |

Primary Examiner—George H. Miller, Jr.
Attorney, Agent, or Firm—Fitzpatrick, Cella, Harper & Scinto

[57] ABSTRACT

A recording apparatus has a linear motor, a recording head driven by the linear motor, and a detector for detecting the length of data to be recorded by the recording head. The running direction of the recording head is changed in response to the output of the detector.

4 Claims, 35 Drawing Figures

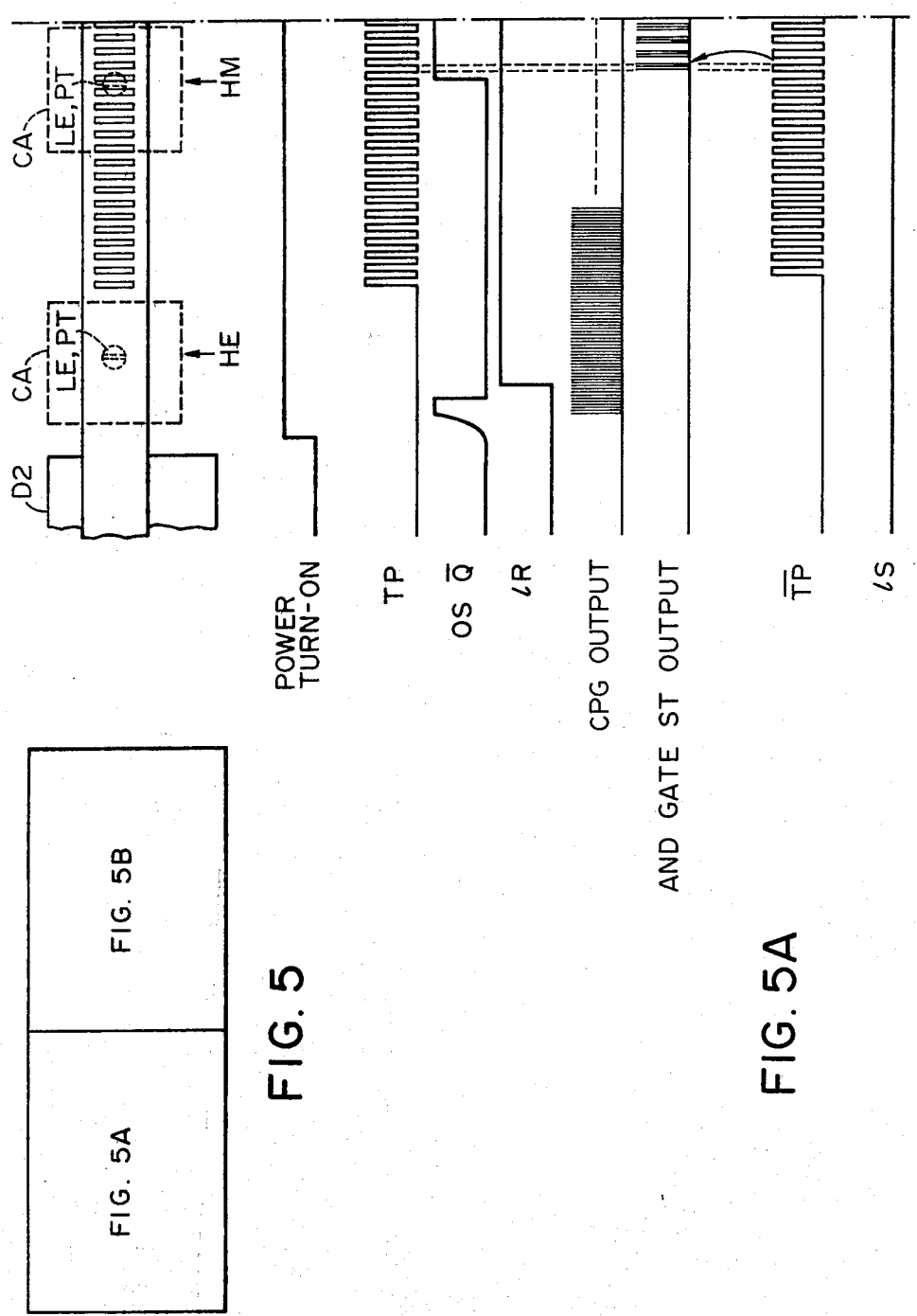

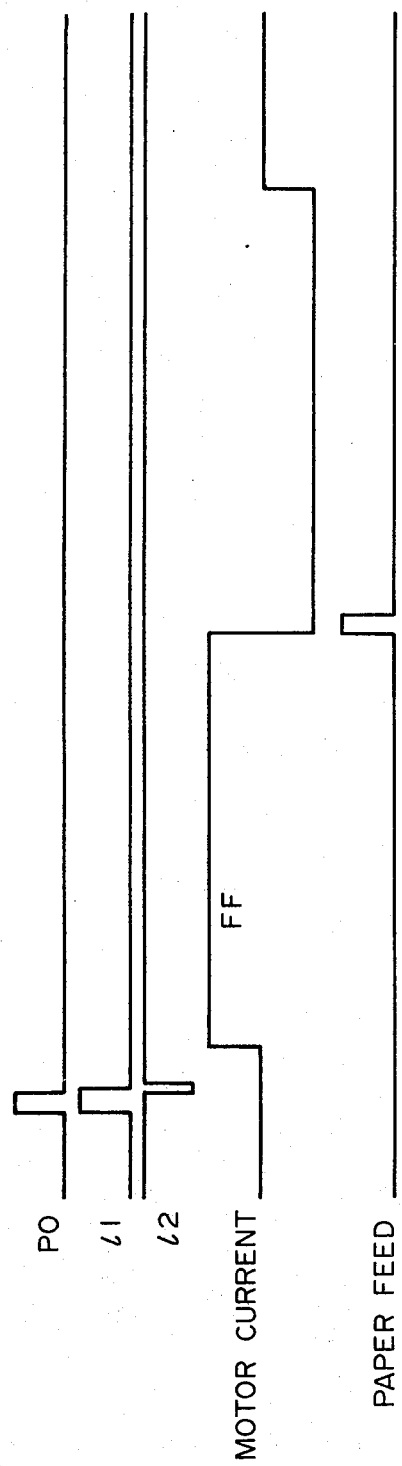

RECORDING APPARATUS

BACKGROUND OF THE INVENTION

1. Field of the Invention

The present invention relates to a high-speed small recording apparatus, and more particularly to a recording apparatus adapted for use in an electronic calculator, a cash register, a small home-use facsimile, a small home-use copier and the like.

2. Description of the Prior Art

The small recording apparatus known in the prior art is inevitably of a low speed, and a higher recording speed can only be obtained at the sacrifice of space.

SUMMARY OF THE INVENTION

The object of the present invention is to provide a recording apparatus which can be realized in an extremely small size, which can be operated at a high speed and which can easily achieve a high density recording.

BRIEF DESCRIPTION OF THE DRAWINGS

FIGS. 4A-1, 4A-2, 4A-3 and 4A-4 is a block diagram showing an embodiment of the control block;

FIGS. 6A and 6B are waveform charts showing the print function thereof;

DESCRIPTION OF THE PREFERRED EMBODIMENTS

Figure 1:
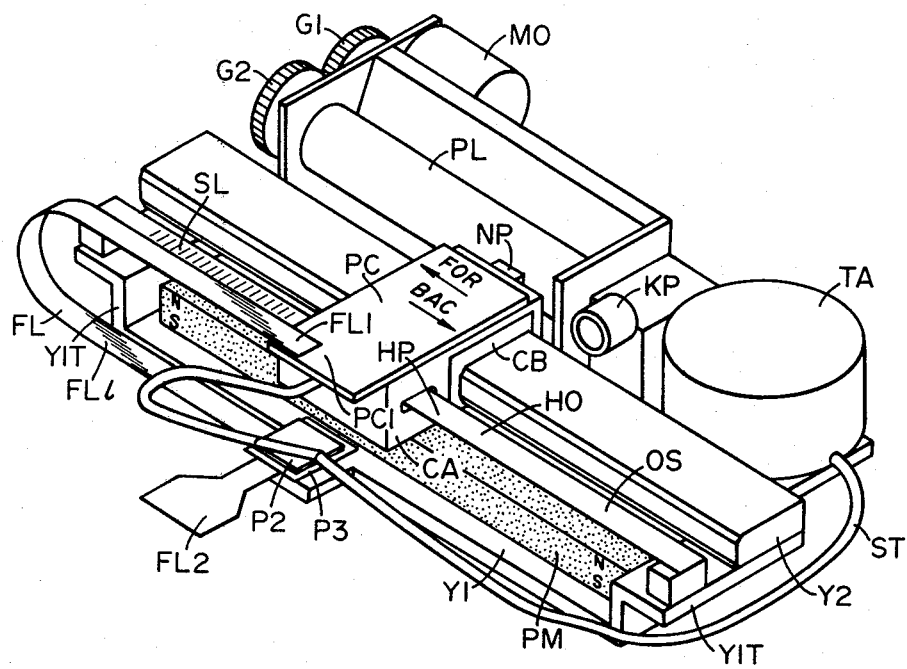
FIG. 1 is a schematic perspective view of the recording apparatus of the present invention.
Figure 2:
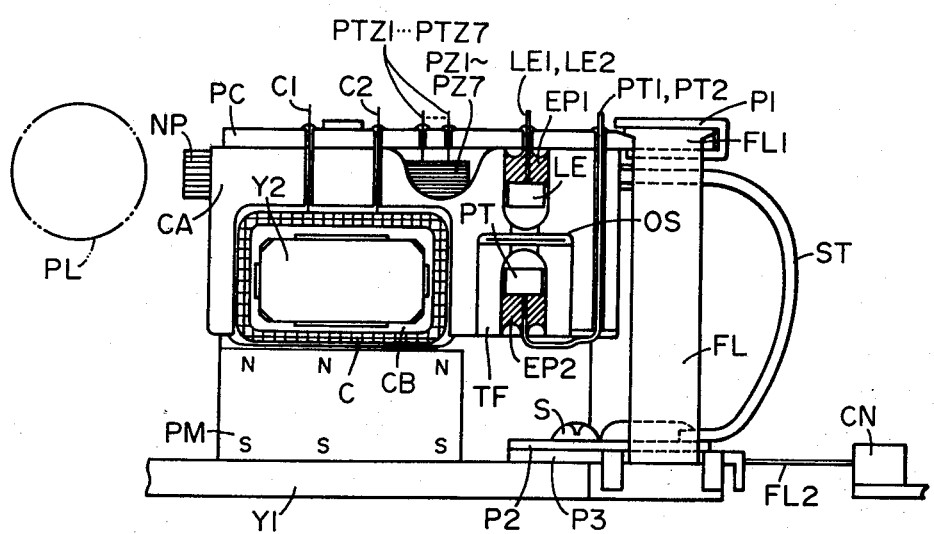
FIG. 2 is a cross-sectional view thereof.

FIGS. 1 and 2 show, respectively in a perspective view and a cross-sectional view, a recording apparatus of the present invention in which a carriage CA having for example seven ink jet nozzle NP is driven by a linear motor.

The linear motor includes a closed magnetic circuit composed of a permanent magnet PM, a magnetic plate member Y1 and a magnetic guide member Y2, and a drive current is supplied to a coil C wound on a coil bobbin CB slidably mounted on said magnetic guide member to drive the carriage CA integrally fixed to said coil bobbin CB through Fleming's left-hand rule. The reciprocating motion of the carriage CA on the guide member Y2 can be achieved by changing the direction of current supplied to the coil C. A graduation plate, for example a non-magnetic optical slit plate OS, is provided parallel to the guide member Y2 and is horizontally fixed at both ends to the bent end portions Y1T of said magnetic plate Y1 which also support the guide member Y2. The carriage CA is provided with said coil bobbin CB for the coil C, seven ink jet nozzles NP, slit detecting means for example a light-emitting diode LE and a phototransistor PT respectively fixed with adhesive materials EP1, EP2, and a printed circuit board PC. Said printed circuit board PC is electrically and mechanically connected to the terminals C1 and C2 of the coil C, terminals PTZ1–PTZ7 of piezoelectric elements for driving said seven ink jet nozzles NP, terminals LE1 and LE2 of said light-emitting diode LE, and terminals PT1 and PT2 of said phototransistor PT. These signal lines are connected at an end portion PC1 of said printed circuit board PC to an end FL1 of a flexible cable FL, said connecting portion being secured by a fixing plate P1 shown in FIG. 2. The flexible cable FL is folded back in the middle thereof and fixed in position by a cable fixing plate P3 which is secured by a screw S together with a fixing plate P2 for fixing an ink supply tube ST for ink supply from an ink tank TA. The other end portion FL2 of said flexible cable FL is connected with a connector CN shown in FIG. 2 for driving the carriage CA and piezoelectric elements PZ1–PZ7 of the ink jet nozzles NP through said flexible cable FL. The optical slit plate OS is positioned between said light-emitting diode LE and phototransistor PT. Thus, with the displacement of the carriage, the infrared light emitted by the light-emitting diode LE is received by said phototransistor PT through the slits SL and a receiving slit (not shown) of a same dimension provided on said phototransistor to generate timing pulses TP by repeated on-off actions of the phototransistor PT. Said timing pulses TP are utilized for detecting the speed and position of the carriage CA in the scanning motion and thus for controlling the ink jet nozzles and paper-feed stepping motor MO. The characters in a row are composed of dot matrixes. The scanning motion of the carriage is initiated in response to a print instruction signal, and voltages are supplied to the piezoelectric elements PZ1–PZ7 of the seven ink jet nozzles at determined positions determined by the timing pulses TP, whereby the ink droplets are emitted to perform recording of a row on an unrepresented recording sheet. Upon completion of the printing of a row the paper-feed stepping motor MO is rotated by an amount corresponding to the pitch between the rows and simultaneously the carriage CA is return to a start position HP or HO. The paper feed is achieved through reducing gears G1 and G2 which are driven by an unrepresented gear mounted on the motor shaft. The final gear G2 is mounted on the shaft of platen PL for line feed. After the completion of the printing operation the ink jet nozzles NP are returned to and stopped at the position HO of a cap KP, which prevents the clogging, drying and meniscus retraction of the nozzles.

As explained in the foregoing, the present embodiment which features a parallel arrangement of the magnetic plate combined with a permanent magnet, the carriage guide member and the non-magnetic graduation plate, provides a small, thin and simple structure without disturbing the magnetid field.

Also it is possible to obtain an extremely quiet recording apparatus because of the absence of rotary motor and associated gears, links, racks etc. in the carriage drive and also of ratchet, plunger etc. in the paper feed.

Furthermore the sliding contact of the carriage with the graduation plate removes the ink eventually deposited thereon, thus preventing errors in the response of the optical detecting means.

Also the use of a printed circuit board mounted on the carriage and connected to various electrical components allows simpler and more inexpensive manufacture, and the use of a flexible cable ensures free displacing motion of the carriage and enables a simple fixation of said cable together with the ink supply tube.

Figure 3:
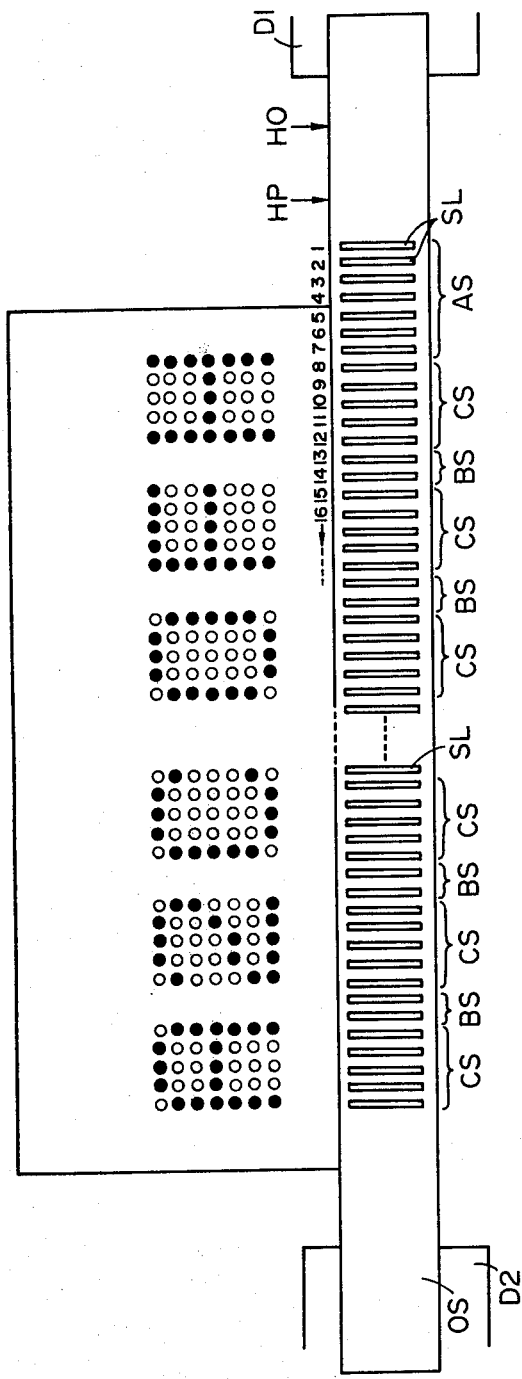
FIG. 3 is a magnified view of the graduation plate.

In this embodiment the optical slit plate OS is provided with slits SL as shown in FIG. 3 for the control of speed and position.

The carriage speed is regulated after the start from a start position HP or HO until eight slits SL are counted (said number of slits being dependent on the carriage speed). The printing of a character of the first column is initiated at the counting of the 8th slit and is conducted during five slits 8-12, while succeeding two slits 13 and 14 being used for forming a blank between the columns, and the printing operation is repeated thereafter in a similar manner. AS, CS and BS respectively represent approach slits, character slits and blank slits, which provide a constant carriage speed.

The present embodiment is provided with seven ink jet nozzles which may be utilized in one-directional or two-directional recording, but the following description will be concentrated on the one-directional recording.

The length of data contained in a row is generally variable, and the carriage in the present embodiment is reciprocated according to the length of data, in order to reduce the time required for recording.

In the case of effecting positional detection and speed control by means of an optical slit plate OS cooperating with a photodetecting circuit mounted on the carriage CA reciprocated by a linear motor as employed in the present invention, when a reverse current is supplied to the coil C in order to return the carriage CA to the initial position after the printing of a determined number of characters, the carriage CA does not initiate backward motion immediately but continues the forward motion for a while by inertia, then pauses for a while and initiates the backward motion, and the amount of such inertial forward motion is unknown because of the absence of other detecting means.

In the following is explained, in relation to FIGS. 4A and 4B an embodiment of a control system capable of controlling such a direction change.

Figure 4A:
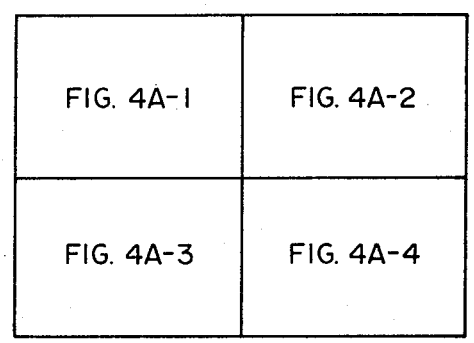
FIG. 4A comprising
Figure 4B:
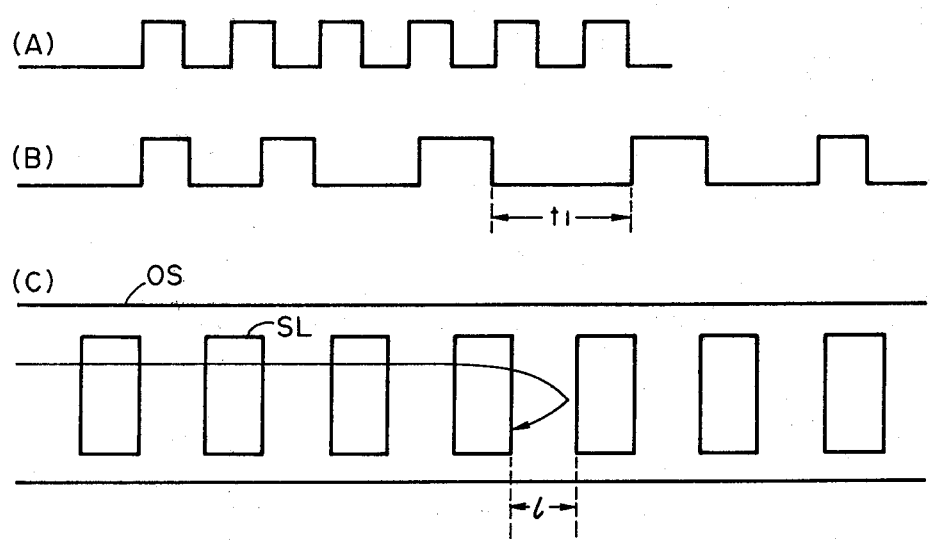
FIG. 4B is a waveform chart showing the function thereof.
Figures 1, 4A:
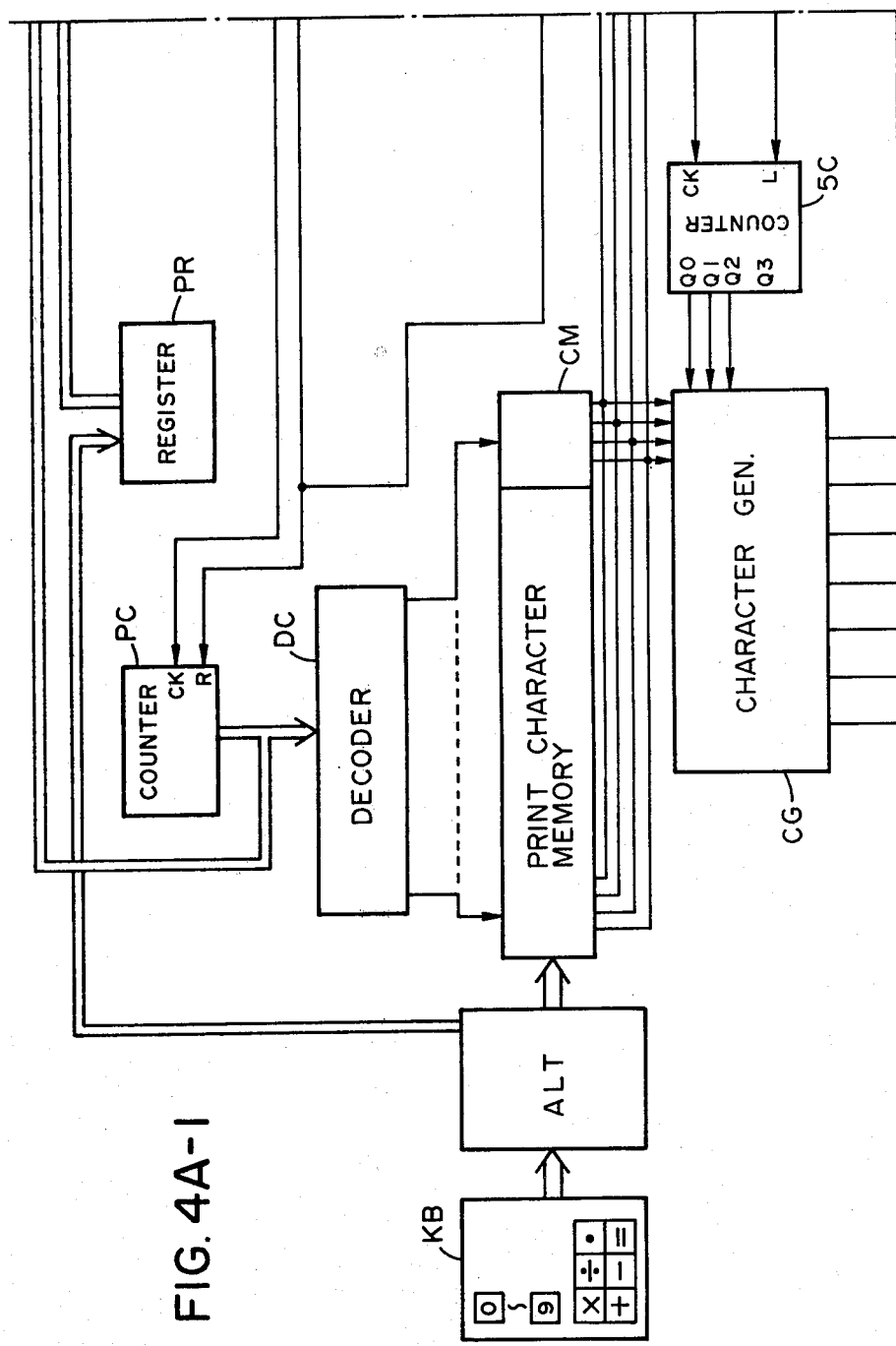
Figures 2, 4A:
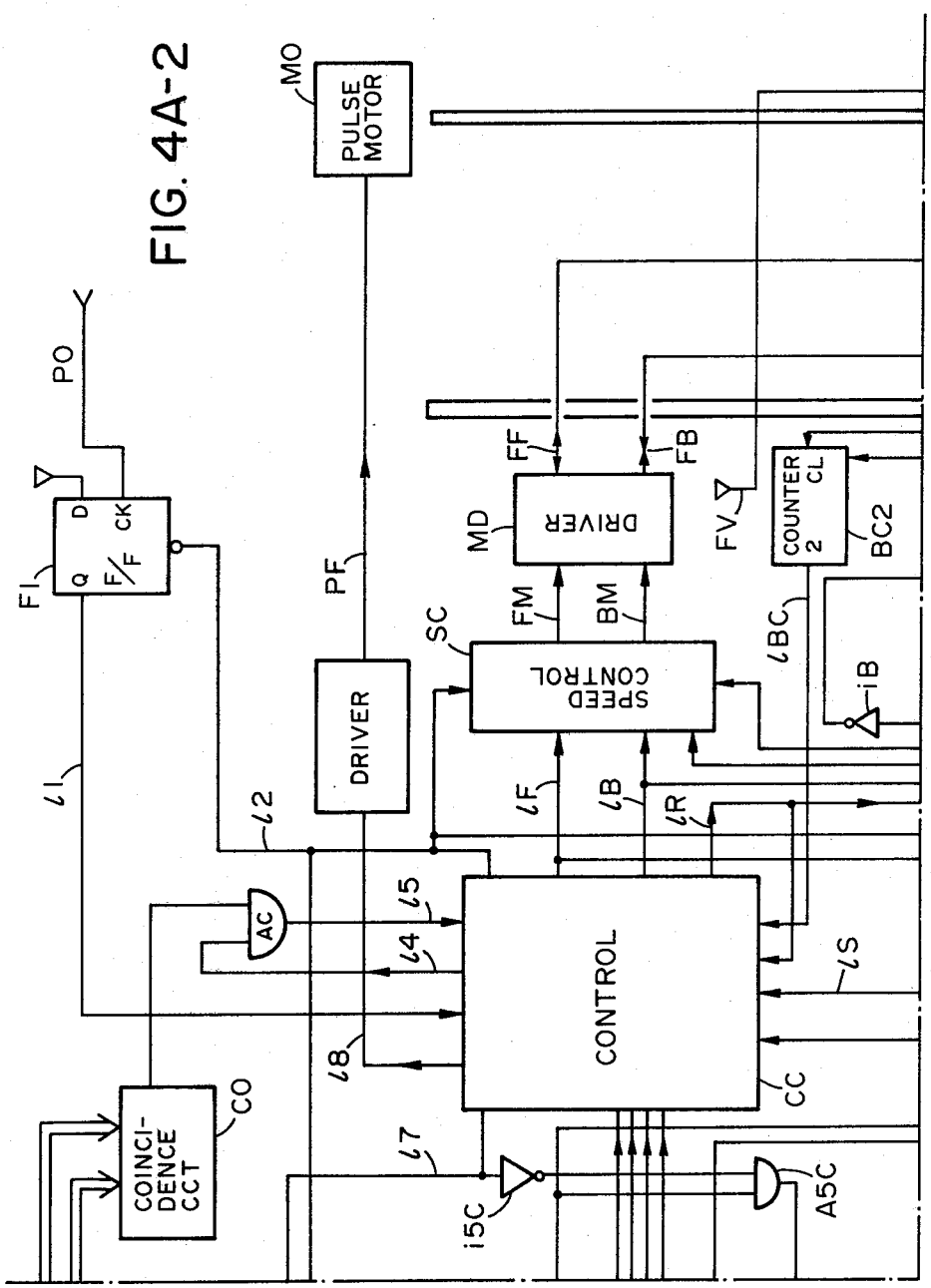
Figures 3, 4A:
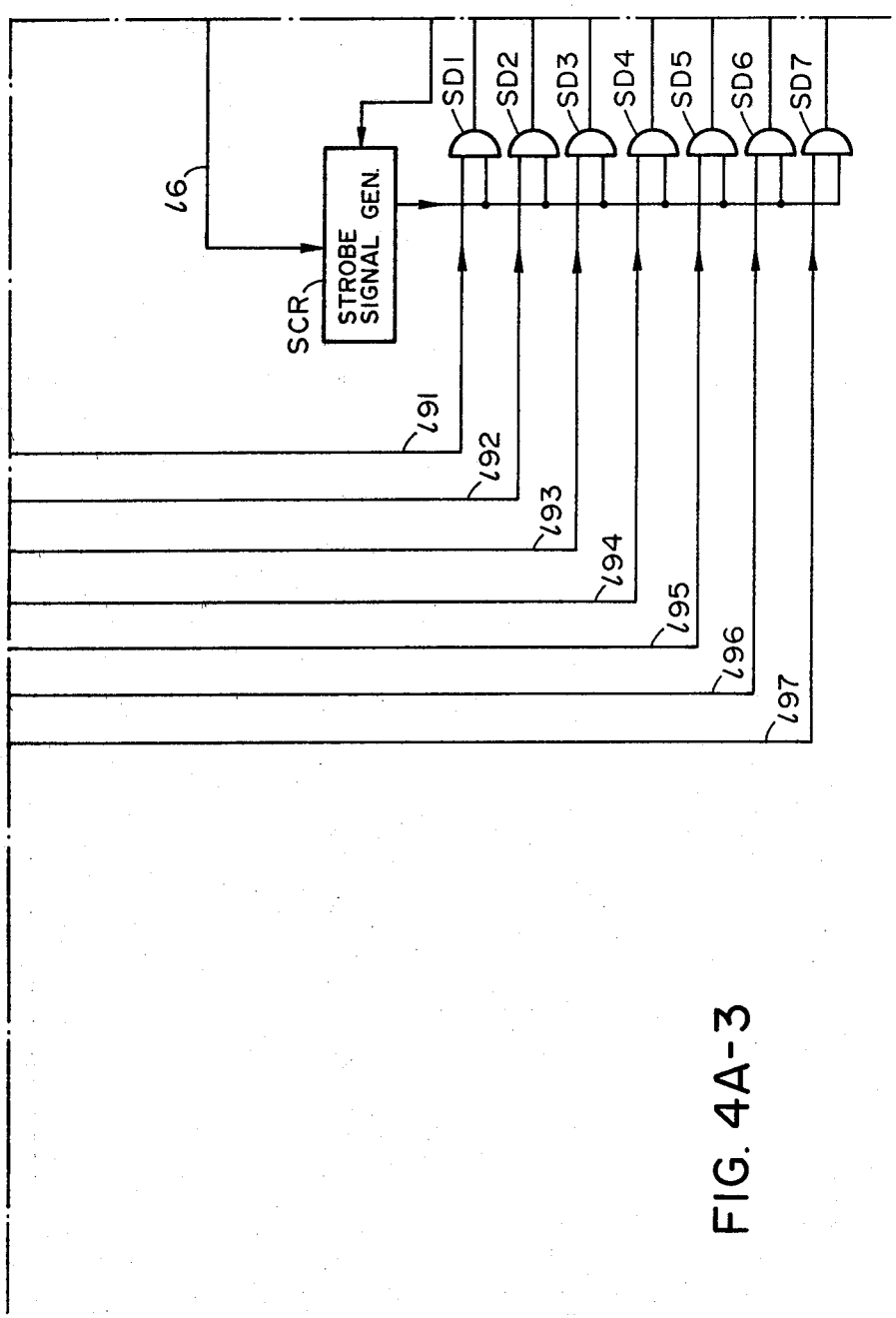
Figures 4, 4A:
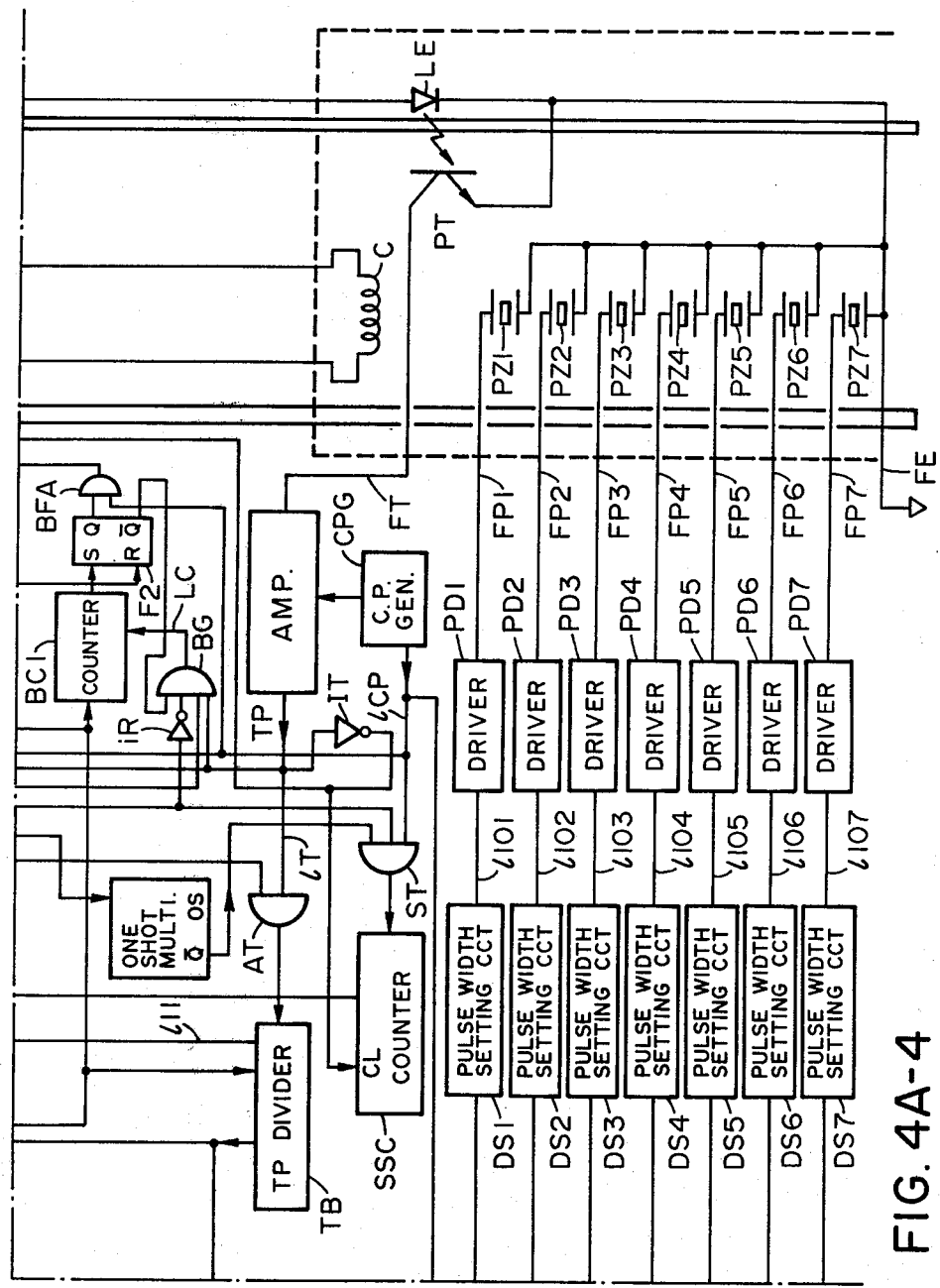

When the carriage CA is displaced at a constant speed along the optical slit plate OS, the photodetecting elements LE, PT provide timing pulses TP as shown in FIG. 4B(A) through an amplifier AP to a signal line IT shown in FIG. 4A, said timing pulses being utilized for identifying the position of the carriage CA. However, when the carriage speed is not constant, or particularly when the moving direction of the carriage is changed, the width and interval of said pulses become variable as shown in FIG. 4B(B).

The speed $v$ of the carriage CA of a mass m under a force F is represented by:

$$m \cdot dv/dt = F - \eta v$$

wherein $\eta$ is the friction coefficient. By rewriting $m/v = \tau$ there is obtained for a initial speed of $v_o$:

$$v = v_o exp(-t/\tau) + F/\eta (1 - exp(-t/\tau)).$$

In a directional change the pulse interval becomes most extended where the carriage makes a full reciprocating cycle in an opaque portion of the optical slit plate OS as shown in FIG. 4B(C). The time required for such reciprocating cycle ($t_1$ in FIG. 4B(B)) is given from the above equation as:

$$t_1 = 2\sqrt{2ml/F}$$

wherein l is the length of said opaque portion and the friction is neglected as the speed is small at the directional change.

On the other hand, upon arrival at the home position, the carriage may attain a maximum speed of $F/\eta$ (called end speed) according also to the above equation.

Thus it is rendered possible to detect the home position through comparison with the interval $t_1$ if the slit plate is provided with an opaque portion of a length at least equal to $F/\eta \times t_1$ or $2\sqrt{2mFl}/\eta$. Thus the present control system is also featured by the structure of the slit plate having an opaque portion of a length not smaller than $2\sqrt{2mFl}/\eta$ in the home position area.

Also when reversing the moving direction of the carriage CA by supplying a reverse current to the coil C after the completion of printing of an arbitrary column, the distance required for stopping and the distance required for reaching a constant backward speed from such stopped position will both be represented by $S = \frac{1}{2}mv^2/F$ in the absence of friction, wherein S is the distance, m is the mass, F is the drive force and $v$ is the speed. In practice, however, the presence of friction will reduce the former distance for stopping and increase the latter distance for acceleration.

Consequently the number of slits to be counted from the start of backward carriage drive to the attainment of the constant backward speed can be obtained by the above-mentioned distances divided by the slit interval and added with a suitable margin. Thus the detection of the home position can be achieved by comparing, after the counting of the above-mentioned slit number, the time required for passing an opaque portion during constant-speed motion of the carriage CA and the time required for passing the opaque portion in the home position area.

During the constant-speed displacement of the carriage CA, the time required for passing an opaque portion of a length l in the slit plate OS is given by $l/v$. The time for comparison in the home position area can be of any length larger than the above-mentione value, but usually is selected in the range of five times of said $1/v$.

This drive system is advantageous in that the drive is not interrupted even when the carriage speed is decreased for example by a change in the friction since the number of slits is counted at the directional change, and that the time required for detecting the home position is shortened since the time comparison is made with the time required for passing a distance 1 in the constant-speed displacement, thus inproving the printing speed.

For the purpose of achieving the above-explained control the control circuit shown in FIG. 4A is provided with a backward counter BC1, a flip-flop F2, a backward counter BC2, gates BG, BFA and an inverter iR.

Now there will be given an explanation on the comprehensive control in the present embodiment, while making particular reference to FIG. 4A. Lead wires FF, FB, FV, FT, FP1–FP7 and FE are compounded as wires FL1 in the flexible cable FL shown in FIG. 1 to facilitate the displacement of the carriage CA. Upon turning on of the power supply, a control unit CC maintains a signal line l2 at 0-level for a determined period to reset the flip-flop F1, to clear a timing pulse dividing circuit TB, a print column counter PC and a backward counter BC1, to reset a flip-flop F2 through an inverter iB, to preset a counter 5C through a gate A5C, to activate a one-shot multivibrator OS and to supply a 1-level signal to a gate ST through a signal line lR.

Figure 5B:
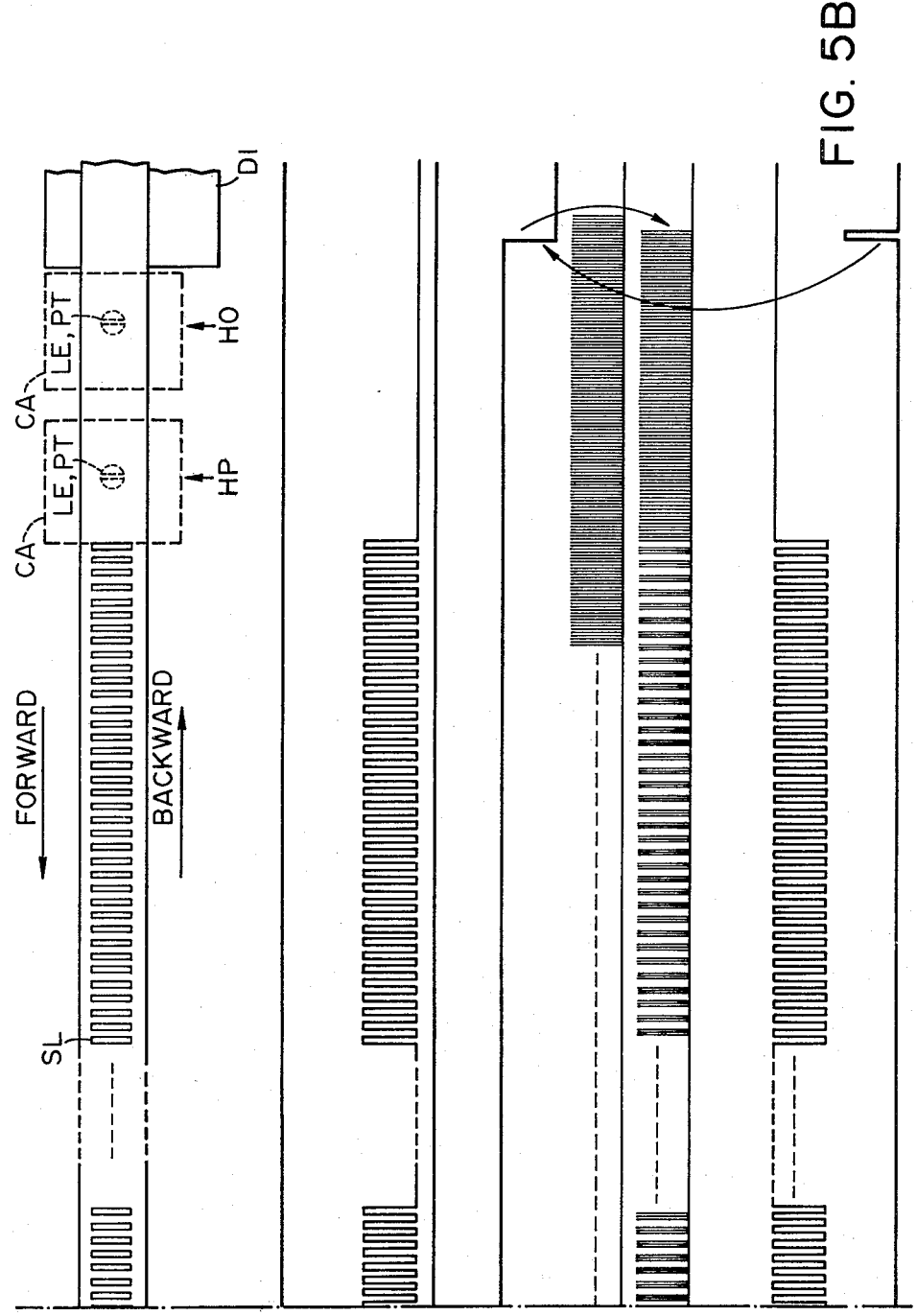
FIG. 5 is a waveform chart showing the initial function.

Also signal lines lF and lB for driving the coil C are respectively maintained at 0-level and 1-level for displacing the carriage CA in the backward direction toward the initial position HO shown in FIG. 5.

The functioning time of the one-shot multivibrator is so selected that the carriage CA, if located at the left-hand end position in FIG. 5, can displace for example to a position HM. States differently said functioning time is selected in such a manner that the carriage reaches a certain speed during said time in order to prevent erroneous identification of the home position during the initial low speed state.

In response to the above-mentioned coil drive for example from a carriage position HE in FIG. 5, the light transmitted through the slits SL generates timing pulse signals TP to the signal line lT through an amplifier AP shown in FIG. 4A, whereby an inverted signal $\overline{TP}$ obtained through an inverter iT is supplied to a clear terminal of a counter SSC. However the output of a clock pulse generator CPG is not supplied to said counter SSC during the functioning time of the one-shot multivibrator OS as the gate ST is closed during said functioning time.

During said functioning time the carriage is displaced from the position HE to HM and reaches a determined speed, and, upon expiration of the functioning time of the one-shot multivibrator OS, the counter SSC is cleared when the signal $\overline{TP}$ is "0" or receives the output signals from the clock pulse generator CPG when the signal $\overline{TP}$ is "1", i.e. when the carriage is positioned corresponding to an opaque portion of the slit plate.

In this manner the counter SSC provides no output signal as it is cleared at the trailing end of the signal $\overline{TP}$ at each passage of the carriage CA through a slit SL. The capacity of the counter SSC is selected to be satisfactorily larger than the number of pulses received from the clock pulse generator CPG during the passage of an opaque portion or even larger than the number of pulses receivable during the displacement of the carriage to the position HO. Thus, after the displacement of the carriage through the slits to the position HO, the counter releases an output signal to a signal line lS. In response to said signal the control unit CC identifies that the carriage CA has moved to the initial position and shifts the signal lines lB and lR to 0-level thereby stopping the carriage and closing the gate ST. Also the input to the gate BG through an inverter IR is shifted to the 1-level. D1 and D2 shown in FIG. 5 are cushioning members for example composed of a foamed material for absorbing the shock of collision of the carriage and the noise associated therewith. In the following is explained the ordinary printing operation. The information to be printed is stored from a keyboard KB and through an arithmetic logic unit ALT into a character memory CM and a print column register PR. In response to a print instruction signal PO shown in FIG. 6A the flip-flop F1 is set to shift the control unit CC to a print operation mode through the set output signal line l1, whereby the signal line l2 is maintained at 0-level for a determined period to reset the flip-flop F1, to clear the print column counter PC, backward counter BC1 and timing pulse dividing circuit TB, to reset the flip-flop F2 through the inverter iB and to preset the counter 5C to F through the gate A5C.

The one-shot multivibrator OS is also activated at the same time, but the counter SSC is not affected since the gate ST is closed by the 0-level state of the signal line lR. The gate BG is opened through the inverter iR but the backward counter BC1 is not actuated because the signal lines lB and TP are both in the 0-level state. The control unit CC, after executing the above-mentioned clearing and resetting operations, shift a signal line l4 to "1" to open a gate AC and receives, through a signal line l5, the output of a coincidence circuit CO for comparing the content of the print column counter PC with that of the print column register PR. In the absence of coincidence the signal lines lF and lB are respectively shifted to "1" and "0" whereby the coil C is driven by a driver circuit MD to displace the carriage CA in the forward direction.

In case the print column counter PC stores a number "0" while the print column register PR stores a number "n" for example, the coincidence circuit CO releases a signal indicating the absence of coincidence in response to which the control unit CC performs the drive function in the above-explained manner.

Figure 6B:
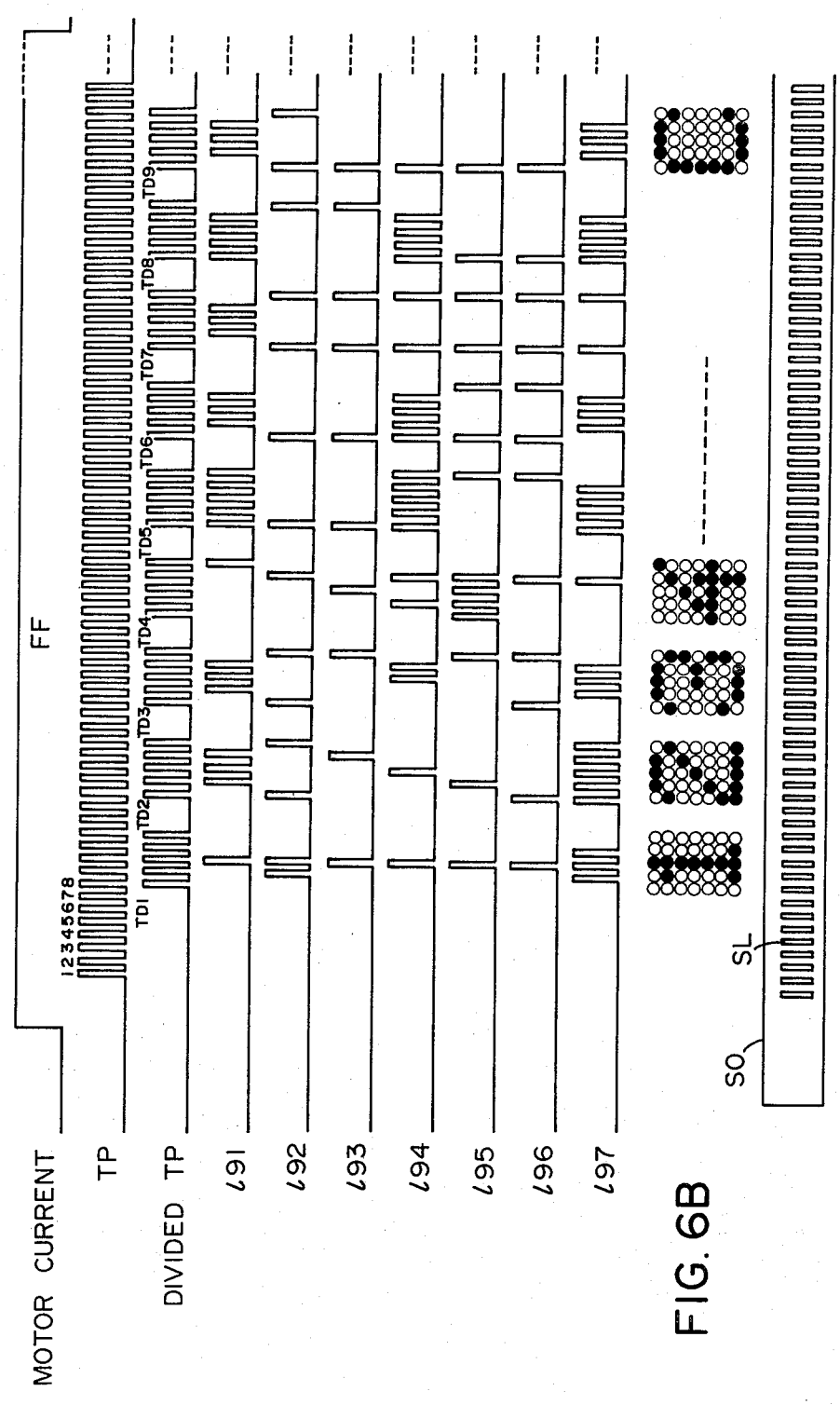

Along with the forward displacement of the carriage CA, the photodetecting elements LE, PT move on the slit plate OS and the detected signals are supplied as timing pulses TP through the amplifier AP. Said timing pulses TP are supplied through a gate At opened by a signal line lF and separated, by a timing pulse dividing circuit TB, into the groups of 5 pulses TD1–TDn for column printing as shown in FIG. 6B, said grouped pulses being supplied through a signal line l6 to a counter 5C and then to a character generator CG.

The number of characters to be printed in a row is in advance stored in the print column register PR while the number of printed characters is counted by the print column counter PC whose output signal is received by a decoder DC for selecting the information stored in the print character memory CM.

In response to the thus selected information and in cooperation with the output control by the counter 5C, the character generator CG releases the print signals representing the vertical seven dots of a 5×7 dot matrix.

Figure 7:
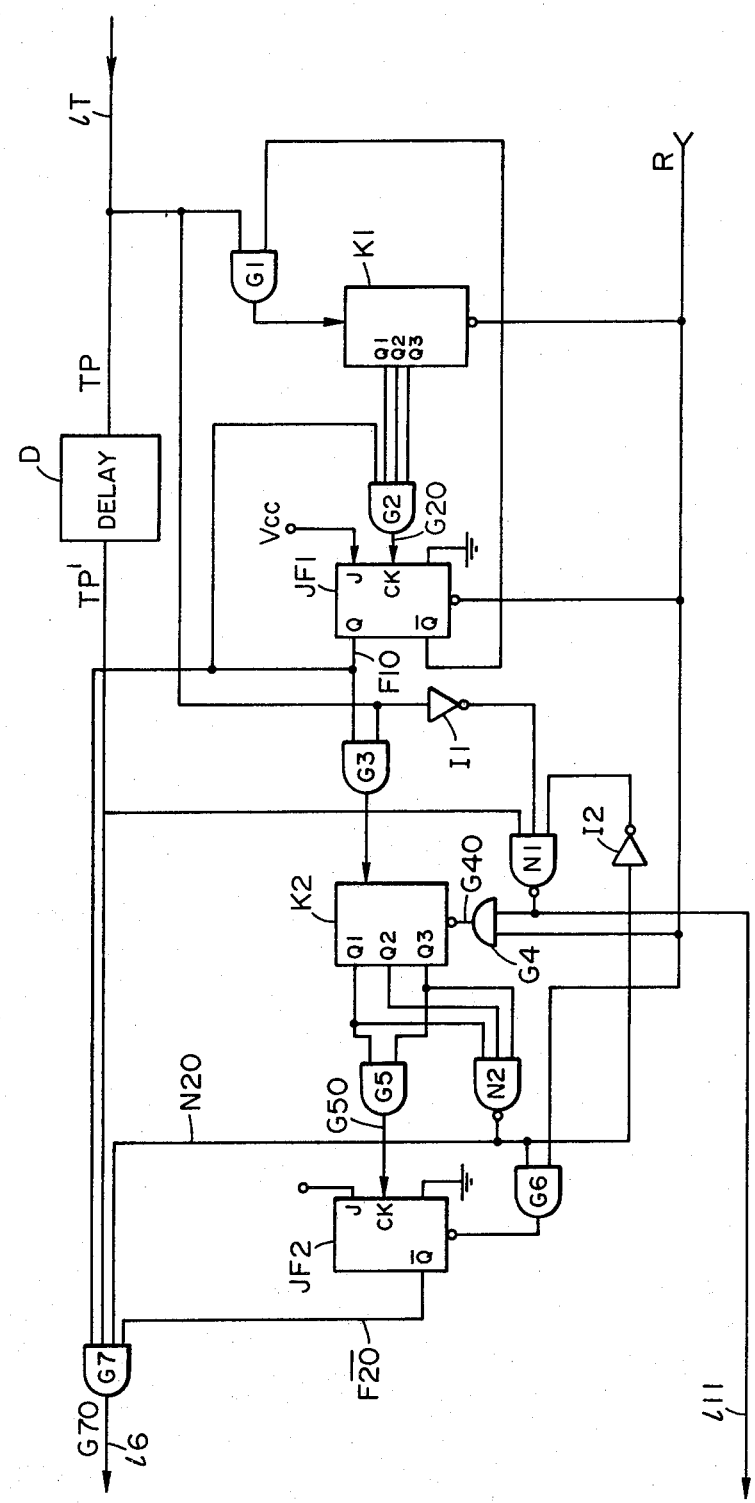
FIG. 7 is a circuit diagram showing the detail of a part of the control block shown in FIG. 4A.
Figure 8:
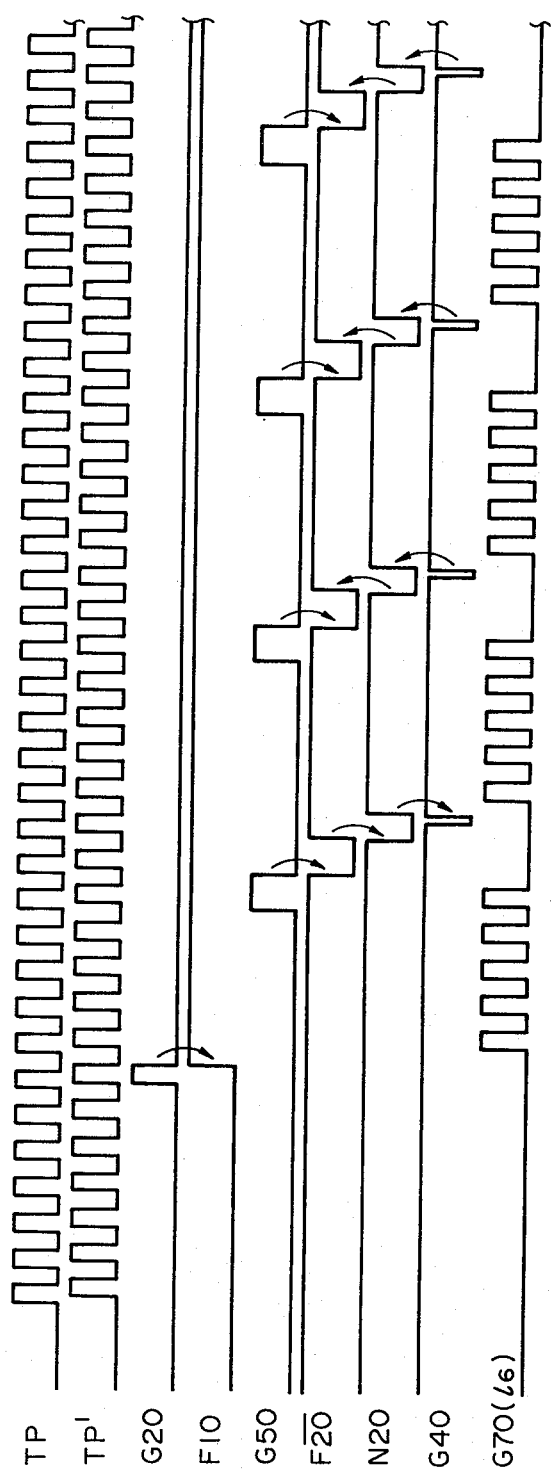
FIG. 8 is a waveform chart showing the function thereof.

When the first pulse of the 5-pulse group is released to the signal line 16 from the dividing circuit TB in response to a timing pulse TP during the forward displacement of the carriage, the counter 5C is step advanced to 0 whereby the print signals for 7 dots of the 1st dot column are supplied from the character generator CG through signal lines 191-197 to gates SD1-SD7. Said AND gates SD1-SD7 are opened by a strobe signal supplied by a strobe signal generator SCR in response to the high-level state of the group of five timing pulses thereby supplying output signals to pulse-width setting circuits DS1-DS7. In this manner pulses of a determined width are supplied through output signal lines 1101-1107 to the piezoelectric elements PD1-PD7 thereby selectively driving said elements and causing selective emission of ink droplets to achieve the printing. The timing pulse dividing circuit TB shown in FIG. 4A is for example composed, as shown in FIG. 7, of counters K1 and K2, and JK, flip-flops JF1 and JF2, AND gates G1-G7, NAND gates N1 and N2 and inverters I1 and I2 and functions to generate signals TD1-TDn on the signal line 16 according to the timing chart shown in FIG. 8.

In the foregoing is explained the printing of 7 dots constituting the first dot column in the five dot columns of the 5×7 dot matrix of the first character in a row. Upon completion of said printing the 2nd pulse in the 5-pulse group is supplied through the signal line 16 to step advance the counter 5C whereby the character generator CG releases signals for 7 dots of the 2nd dot column of the 5×7 dot matrix to perform dot printing in the same manner. The counter 5C is step advanced in a similar manner in response to the succeeding 3rd to 5th pulses to perform the printing of the 3rd to 5th dot columns on the 5×7 dot matrix, thereby completing the printing of a character in the 1st column. The control unit CC detects the completion of said printing through a signal line 111, and releases a signal to a signal line 17 to step advance the print column counter PC, and to preset the counter 5C to the initial value through the inverter i5C. Thereafter the coincidence circuit compares the content of the print column register PR with that of the print column counter PC and releases the result of said comparison to the signal line 15 through the gate AC opened by the signal line 14, and, in the absence of coincidence the print character memory CM releases an output signal corresponding to the step advanced content of the counter PC thereby performing the printing by the 5-pulse signal TD2 supplied to the signal line 16 from the dividing circuit TB.

The above-mentioned operations from the step advancing of the print column counter to the memory readout and signal input to the character generator are conducted sufficiently faster than the interval of the timing pulses and can therefore be executed sufficiently before the entry of succeeding 5-pulse group to the counter 5C. In this manner the printing of 5×7 dot matrixes is conducted in response to the signals TD3, TD4, . . . , TDn. Thus, when the coincidence circuit CO identifies that the content of the print column counter PC is equal to that of the print column register PR, the control unit CC, receiving the output of said coincidence circuit CO through the signal line 15 and the gate AC opened by the signal line 14, detects the completion of the printing of a row.

At this moment the control unit CC checks the state of the output signal line 11 of the flip-flop F1, indicating the presence or absence of succeeding print instruction respectively in the high- and low-level state. In case said signal line is in the high-level state indicating the presence of succeeding print instruction, the control unit CC shifts the signal lines 1F and 1B respectively to the 0-level and 1-level to initiate the backward displacement of the carriage. In this state the backward counter BC1 receives the timing pulses TP as the gate BG is opened by the inverted signal of the line 1R through the inverter iR and also by the high-level signal supplied through the signal line 1B. Said counter counts the number of timing pulses during the backward motion of the carriage. Simultaneously the control unit CC maintains a signal line 18 at the 1-level state for a determined period to activate a driver circuit PFD to effect paper feed of several dot lines for making a space between rows. Upon completion of the timing pulses TP by the backward counter BC1, the flip-flop F2 is set through the signal line 1B to open a gate BFA, whereby the output signals from the clock pulse generator CPG are supplied through the signal line 1CP and said gate BFA to the backward counter BC2. Said backward counter BC2 functions only during the 1-level state of the timing pulse TP as the inverted signal thereof is supplied to the clear terminal through an inverter iT, namely corresponding to the opaque portion of the slit plate OS, said counter thus being adapted to differentiate the passing time in the opaque portion in the home position area from the passing time in the opaque portion between the slits SL. As the former passing time is selected approximately 5 times of the latter passing time as explained in the foregoing, the counter BC2 is cleared at each slit S1 in the opaque areas between the slits to provide no output signal, and only provides an output signal to the signal line 1BC in the home position area. Upon receipt of said output signal the control unit CC identifies that the carriage has moved to the home position outside the slit area and shift the signal line 1B to 0-level thereby terminating the backward displacement of the carriage. The carriage CA still continues backward displaced by inertia even after the termination of motor drive, but is brought to a temporary stop, due to forward drive for the printing operation for the succeeding row as explained in the following, at a position HP shown in FIG. 5. Also during the backward displacement of the carriage the gate AT is closed by the 0-level state of the signal line 1F, so that the dividing circuit TB receives no timing pulses TP and does not therefore perform the printing operation during said backward displacement.

After the termination of the backward drive of the carriage, the control unit CC stores the information of the succeeding row in the print character memory CM and the number of characters to be printed in the print column register PR and assumes the print mode for the succeeding row by maintaining the signal line 12 at the 0-level state for a determined period in a similar manner as explained in the foregoing, thereby to reset the flip-flop F1, to clear the print column counter PC, backward counter BC1 and timing pulse dividing circuit TB, to reset the flip-flop F2 and to preset the counter 5C to the initial value. The one-shot multivibrator OS is also activated simultaneously, but the counter SSC is not affected as the gate ST is closed by the 0-level state of the signal line 1R.

Also in a similar manner as explained in the foregoing the gate AC is opened by the 1-level state of the signal line 14, and the coincidence circuit CO compares the content of the print column counter PC and that of the print column register PR and releases the result of said comparison to the signal line 15 through said gate AC. In the absence of coincidence the printing operation is effected in the above-explained manner, and in the presence of coincidence the printing of said row is terminated and the carriage is returned to the home position also in the above-explained manner. In the presence of a succeeding print instruction, the carriage is returned to the position HP to continue the succeeding printing in a similar manner.

In case the control unit CC detects the 0-level state of the output line 1 of the flip-flop F1 indicating the absence of a succeeding print instruction, the carriage is returned to a stop position HO outside the slit area by a procedure similar to the function at the turning on of the power supply.

The aforementioned home position HP in case of continuing the printing operation is selected different from said stop position HO in order to minimize the time required for carriage displacement in case the printing operation is continued.

It is also possible to return the carriage always to the home position HP instead of said stop position HO, but it is advantageous to have a separate stop position HO for fixing the carriage in position and providing the carriage with protecting means KP for the purpose of capping and cleaning the nozzles. The carriage return to said stop position HO is achieved, in a similar manner as at the turning on of the power supply, by maintaining the signal line 12 at the 0-level state for a determined period, thereby to reset the flip-flop F1, to clear the print column counter PC, timing pulse dividing circuit TB and backward counter BC, to reset the flip-flop F2 and to preset the counter 5C through the gate A5C to the initial value. In this manner the one-shot multivibrator OS is activated, and the gate ST is opened by the 1-level state of the signal line 1R whereby the counter SSC counts the output pulses from the clock pulse generator CPG only when the signal $\overline{TP}$ is in the 1-level state. In this state the gate BG is closed by the inverter iR so that the backward counter BC1 is inoperable.

Thus the control unit CC shifts the signal lines 1F and 1B respectively to the 0-level and 1-level state to initiate the backward displacement of the carriage by the coil C. The counter SSC repeats the counting of the pulses from the clock pulse generator CPG and the resetting in response to the high- and low-level states of the timing pulse TP, and releases an output signal to the output signal line 1S after a determined time when the carriage reaches the position HO shown in FIG. 5. In response to said output signal the control unit CC identifies that the carriage has moved to said stop position HO and shifts the signal line 1B to the 0-level state thereby stopping the carriage at said stop position HO. The signal line 1R is shifted to the 0-level state to close the gate ST, so that the gate BG is opened through the inverter iR. Simultaneously with the aforementioned backward drive, the control unit maintains the signal line 18 at the 1-level state for a determined period to drive the driver PFD, thereby effecting the paper feed and thus completing the printing operation.

Figure 9:
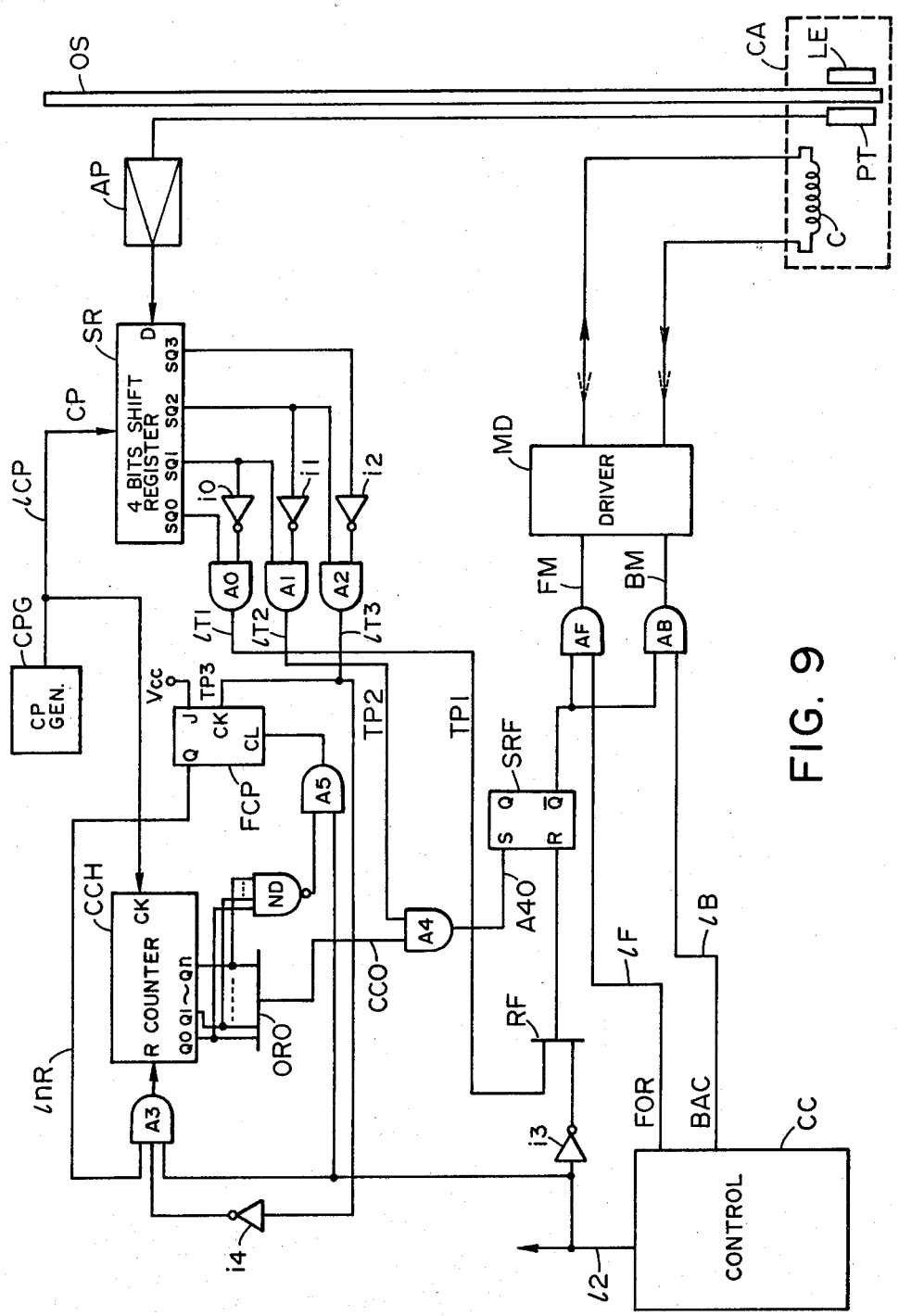
FIG. 9 is a block diagram showing an embodiment for speed control.
Figure 10:
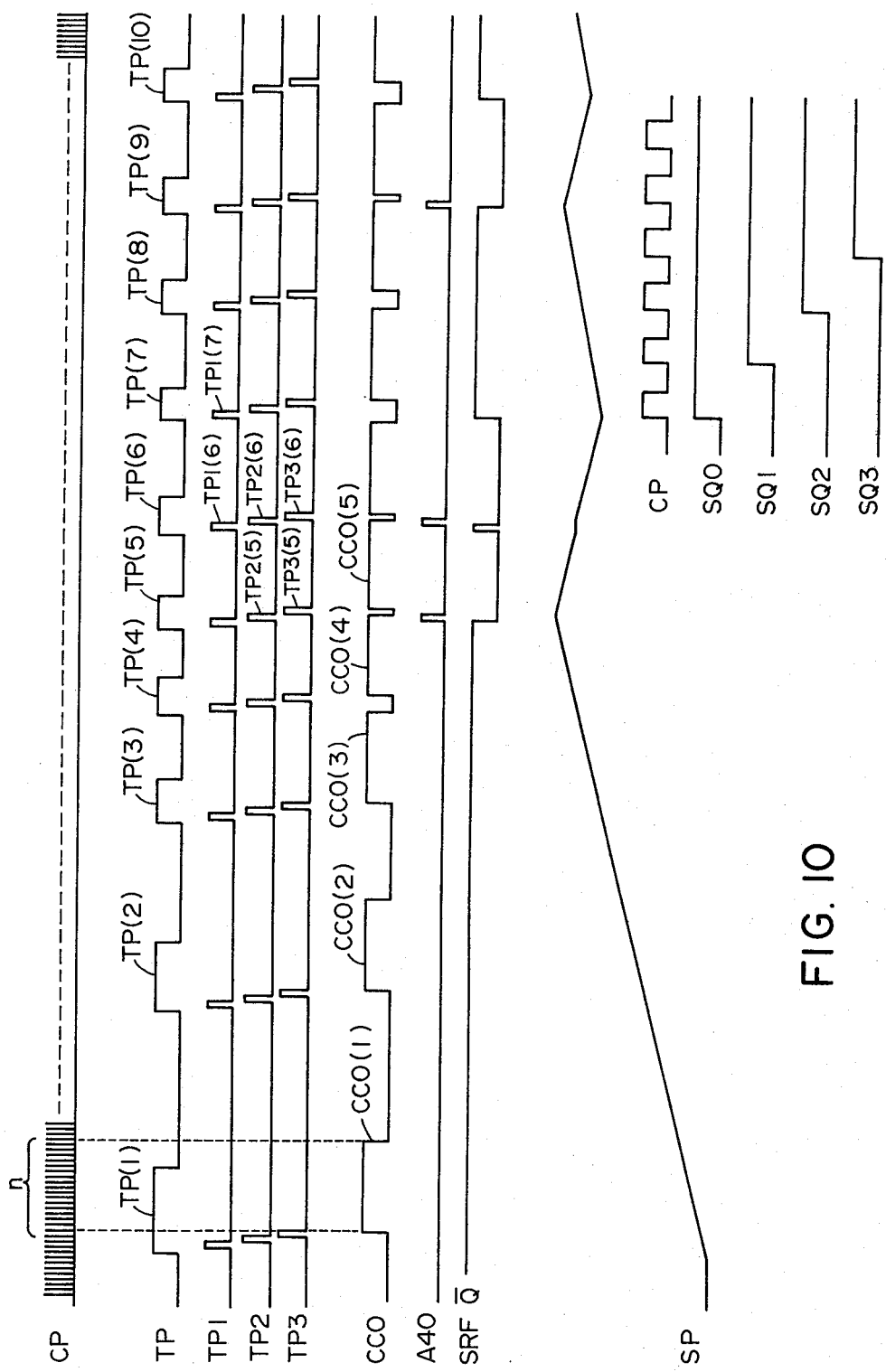
FIG. 10 is a waveform chart showing the function thereof.

SC in FIG. 4A is a speed control circuit for the carriage a detail and waveform chart of which are shown in FIGS. 9 and 10. Referring to these drawings, the carriage CA is displaced along the slit plate OS by the drive with the coil C, and the signals optically detected by the light-emitting diode LE and the phototransistor PT are supplied as timing pulses TP to the signal line 1T through the amplifier AP.

In response to said timing pulses TP, the outputs Q0, Q1, Q2 and Q3 of a 4-bit shift register SR are set in succession by the clock pulses CP from the clock pulse generator CPG. An AND gate A0 supplies the logic product TP1 of the signal Q0 and the inverted signal Q1 obtained through an inverter i0 to a signal line 1T1. Similarly an AND gate A1 supplies the logic product TP2 of the signal Q1 and the inverted signal Q2 obtained from an inverter i1 to a signal line 1T2, and an AND gate A2 supplies the logic product TP3 of the signal Q2 and the inverted signal Q3 obtained through an inverter i2 to a signal line 1T3. Said signals TP1–TP3 are shown in FIG. 10. The signal TP1 supplied through the line 1T1 resets a flip-flop SRF through an OR gate RF, and the signal TP2 supplied through the line 1T2 opens an AND gate A4 during the period of said signal.

Also the signal TP3 supplied through the line 1T3 sets a flip-flop FCP and also is supplied to an AND gate A3 through an inverter i4 so that a counter CCH is reset during the 1-level state of the signal TP3 and receives the clock pulses CP through the signal line 1CP when the signal TP3 assumes the 0-level state.

Said counter CCH is reset through the gate A3 at the start of printing operation by the 0-level state of the signal line 12, and the flip-flop FCP is reset through an AND gate A5 and resets the counter CCH during the 0-level state of the output signal line 1nR. Thus said counter CCH initiates the counting operation when the signal TP3 assumes the 1-level state to set the flip-flop FCP thereby providing a 1-level output signal to the line 1nR and thereafter assumes the 0-level state to release the counter CCH from the resetting, and continues said counting operation until all the output lines Q0–Qn assume the high-level state. Upon reaching a count n, the NAND gate ND releases a 0-level signal to reset the flip-flop FCP, whereby the counter CCH is also reset.

As already explained in the foregoing, the flip-flop SRF is reset through the signal line 12, inverter i3 and OR gate RF, to open the AND gates AF and AB. Thus, in response to the pulse signal TP3 the flip-flop FCP is set and the counter CCH executes the counting of the clock pulses with corresponding outputs to Q0–Qn. During said counting the OR gate ORO releases a 1-level signal to the AND gate A4 through a signal line CCO.

The other input signal line 1T2 of said AND gate A4 receives the aforementioned signal TP2 which is obtained from the timing pulses TP whose timing and width are therefore related to the speed of the carriage. Thus, in response to a timing pulse corresponding to a low carriage speed, as represented by TP(1) in FIG. 10, the signal TP2 is not released during the counting operation of the counter CCH, whereby the gate A4 remain closed and the flip-flop SRF remains reset through the OR gate RF by the signal TP1. In this state the carriage drive by the coil C is continued as the AND gates AF, AB are not affected.

Similarly in response to the succeeding pulses TP(2), TP(3) and TP(4) the drive by the coil C shows no change as the gate A4 still remains closed, but the interval of the timing pulses becomes shorter because of the gradually increasing carriage speed. Thus, in response to the pulse TP(5) the gate A4 receives the output signal CCO(4) from the counter CCH through the gate CCO and the timing pulse TP2(5) at the same time to release a 1-level signal to the signal line A40, thereby setting the flip-flop SRF.

In response thereto the output $\overline{Q}$ thereof is shifted to 0-level to close the AND gates AF and AB, thereby terminating the coil drive through the driver MD. The carriage continues inertial displacement even after the termination of coil drive, however with a decreasing speed due to friction. Then in response to the succeeding timing pulse TP1(6) the flip-flop SRF is reset through the gate RF whereby the output $\overline{Q}$ assumes the 1-level state again to reopen the gates AF and AB, thus restarting the drive by the coil C.

During a period from the signal TP2(5) to the signal TP1(6), the carriage speed is decreased by the suspended coil drive, but not significantly so at the timing pulse TP(6). Consequently the gate A4 receives the output signal CCO(5) from the counter CCH and the signal TP2(6) at the same time to set the flip-flop SRF again, thereby closing the gates AF and AB and interrupting the coil drive until the succeeding signal TP1(7) corresponding to the timing pulse TP(7).

Successively, in a similar manner, said signal TP1(7) resets the flip-flop SRF through the gate RF, whereby the gates AF and AB are reopened to restart the coil drive.

Thereafter the coil drive is conducted according to the logic product of the pulse TP2 and the output of the counter CCH. The drive is not interrupted in response to the pulses TP(7) and TP(8) but is interrupted in response to the pulse TP(9), and in this manner the carriage speed is controlled on the basis of the n-count of the clock pulses by the counter CCH.

In addition to the foregoing ink jet recording head based on a drive by a piezoelectric element, there will now be given an explanation of another recording head based on a different and more advantageous working principle for ink droplet emission. Such recording head is advantageous in obtaining a stable droplet size, a stable emission interval and a higher emission frequency and in an extremely simple structure which allows fine mechanization and thus enables miniaturization of the recording head in comparison with the aforementioned piezo-driven recording head. A multi-nozzle array indispensable for high-speed recording can be realized, in a much easier way than with the piezo-driven head, by the simple structure and by easier mechanical working. In addition the orifice array structure in a multiple-nozzle head can be designed in an arbitrary manner, and the mass production of the recording heads is significantly facilitated. Further it is rendered possible to obtain tonal reproduction by changing the droplet size in a simple manner without sacrificing the recording speed.

Figure 11:
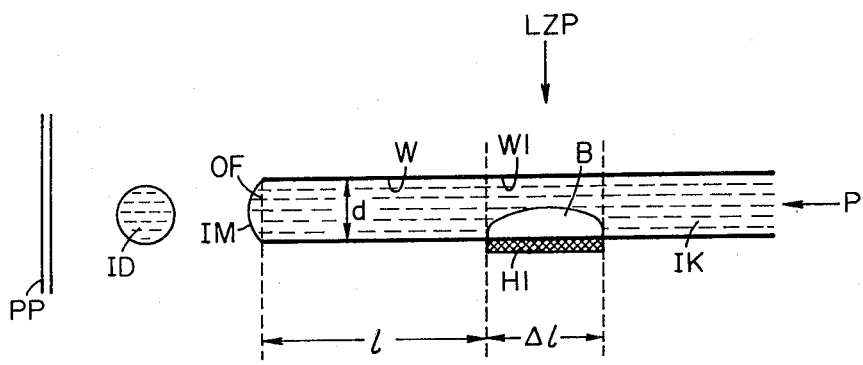
FIGS. 11, 12 and 13 are schematic views showing the working principle of the recording head.

Such a recording head is schematically shown in FIG. 11, in which a liquid chamber W constituting the recording head and having an emission orifice at the front end thereof is filled with a recording liquid IK. In response to a drive signal, a heating element H1 having a width $\Delta l$ corresponding to a portion W1 of the liquid chamber W and separated by a distance l from the orifice OF, initiates a temperature rise. When the heating element H1 reaches a temperature exceeding the evaporating point of said recording liquid, there is generated a bubble B on said heating element. Said bubble B rapidly increases its volume along with the further temperature rise of the heating element H1. As the result the pressure in the liquid chamber portion W1 is rapidly elevated, thus rapidly displacing the liquid present in the portion W1 toward the orifice OF and toward the opposite direction, thereby causing the emission of a part of liquid present in the liquid chamber portion of the length l from the orifice OF in the form of a liquid column. Said liquid column soon stops growing but the front end of said liquid column accumulates the kinetic energy supplied thereto. In case the bubble collides with the ceiling of the liquid chamber portion W1, the colliding force is diverted axially toward the orifice OF to further enhance the liquid emitting force.

Upon termination of the drive signal supplied to the heating element H1, the temperature thereof begins to decrease whereby the bubble B initiates volume contraction with a slight delay. Along with said contraction the liquid is replenished to the liquid chamber portion W1 from the orifice and also from the opposite direction. In this manner the liquid column close to the orifice OF is returned to the liquid chamber W, whereby the front end portion of said liquid column is separated from the rest of the liquid column due to the oppositely directed kinetic energy to form a small ink droplet ID which thus flies toward a recording member PP and is deposited thereon. The bubble B on the heating element H1 gradually disappears by heat dissipation, and said gradual bubble annihilation causes gradual retraction of the liquid meniscus IM while maintaining a stable surface state thereof and thus preventing the failure of succeeding droplet emission resulting from excessive meniscus retraction caused by air introduction through a destructed meniscus surface. The position of bubble generation should be suitably selected since a bubble generated excessively close to the orifice OF will lead to the emission of the bubble itself from the orifice OF giving rise to the destruction of the droplet ID while a bubble excessively distanced from the orifice OF may be unable to cause the droplet emission. The gradual contraction of the bubble B is caused by the heat dissipation, condensation of gas to liquid, capillary liquid supply to the liquid chamber etc.

The dimension of the liquid droplet ID emitted from the orifice OF is dependent on the parameters of the apparatus such as the quantity of supplied thermal energy, width $\Delta l$ subjected to said thermal energy and the distance l from the orifice OF to the heating element H1, and the physical properties of the liquid IK such as the surface tension, specific heat, thermal conductivity, thermal expansion coefficient and viscosity. The above-mentioned heating element may be replaced by instantaneous irradiation with a laser pulse LZP which also causes the generation and annihilation of a bubble B, leading to the droplet emission. In such case the element H1 in the portion $\Delta l$ may be used, if desired, as an opto-thermal converting plate or a heat accumulating plate in order to improve the efficiency of heat generation by said laser pulse.

Figure 12:
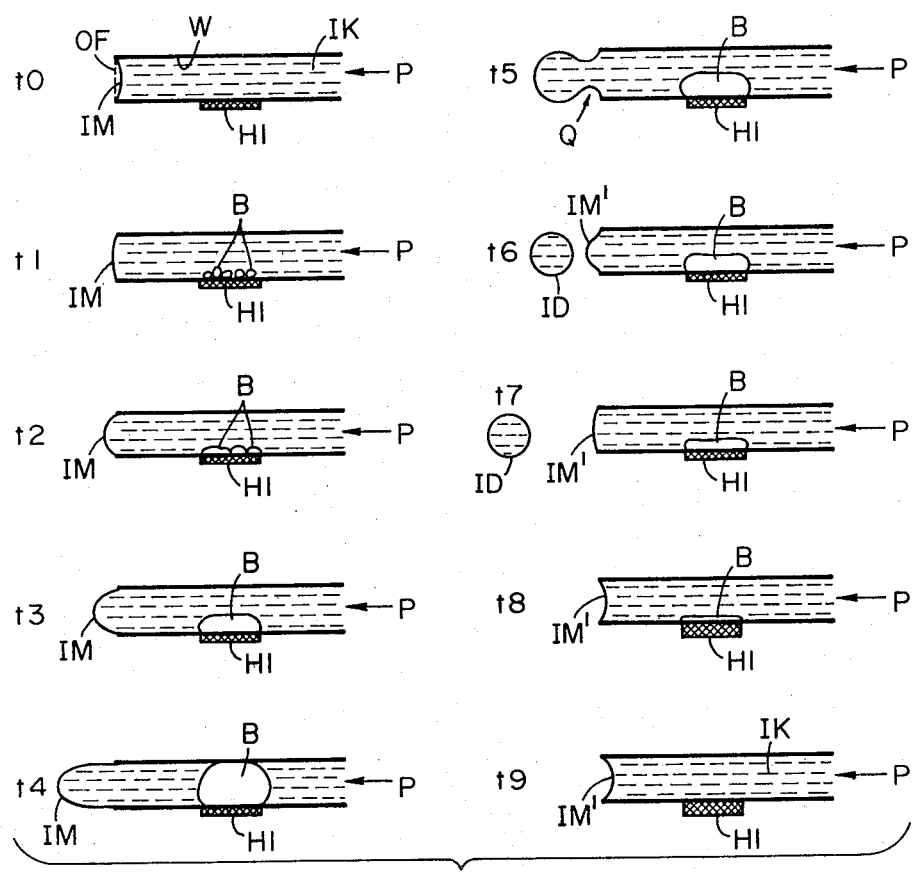
Figure 13:
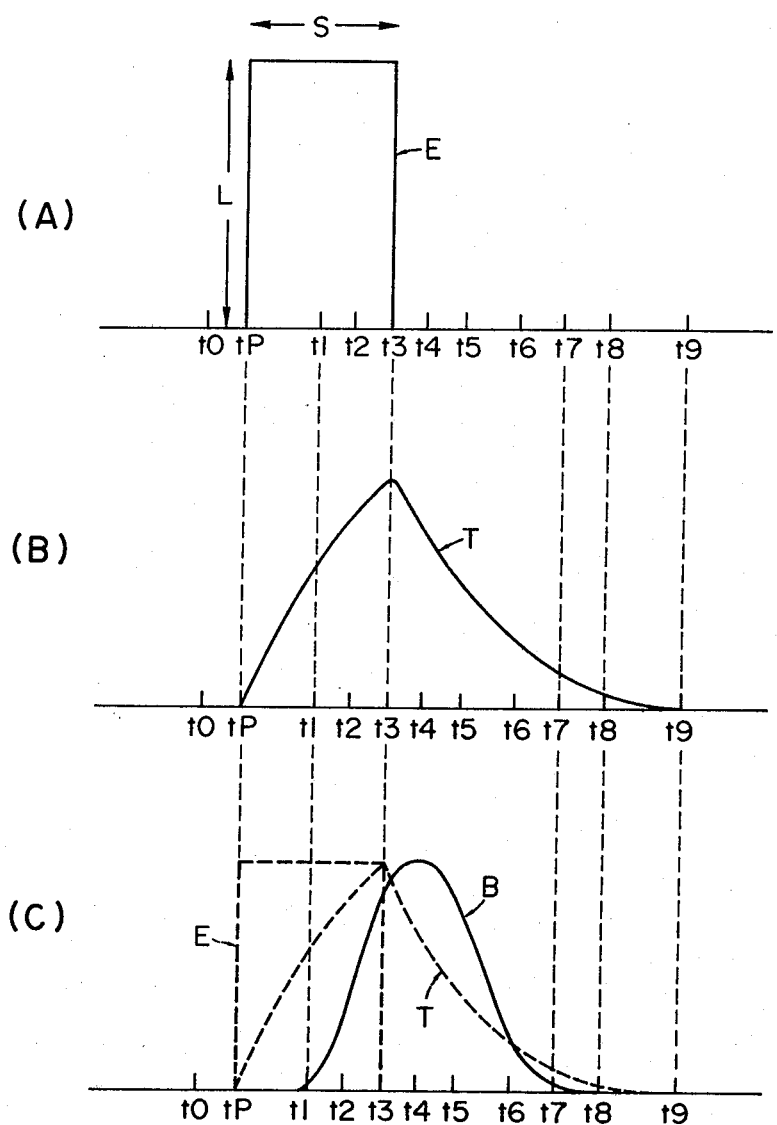

FIG. 12 schematically shows the process of emission of the recording liquid (ink) in the steps t0–t9, wherein there are shown an orifice OF, an ink chamber W and a heating element H1. The arrow P indicates the direction of ink supply, and IM represents the boundary surface or meniscus between the ink and the air. B is a bubble generated on the heating element H1. FIGS. 13A, B and C respectively show an example of a drive pulse E the, temperature T of the heating element H1 and the volume of said bubble B, wherein the times t0–t9 respectively correspond to the steps t0–t9 shown in FIG. 12.

The step t0 shows a state prior to the ink emitting process, and the drive pulse E is initiated at a time tp between t0 and t1. The heating element H1 initiates temperature rise simultaneously with the start of said drive pulse E. At the step t1 the temperature exceeds the evaporating point of the ink, whereby small bubbles B are generated and the meniscus IM becomes expanded corresponding to the amount of liquid expelled by said bubbles B. At the step t2 the bubbles are further developed so that the meniscus is further expanded. At the step t3 the drive pulse reaches the trailing end and the heating element H1 reaches the maximum temperature as shown in FIGS. 13A and 13B, wherein the meniscus IM is further expended. At the step t4 wherein the temperature of the heating element has already started to decrease as shown in FIG. 13B, the bubble B reaches the maximum volume as shown in FIG. 13C with a corresponding maximum expansion of the meniscus IM. At the step t5 the bubble B starts to contract, and the ink protruding from the orifice OF is retracted into the ink chamber W corresponding to said volumetric contraction, thus generating a constricted portion Q in the meniscus IM. At the step t6 the contraction of the bubble B proceeds further, whereby an ink droplet ID becomes separated from the liquid meniscus IM'. At the step t7 the ink droplet continues to fly while the meniscus IM' approaches the orifice OF due to further contraction of the bubble B. At the step t8 the bubble B has almost disappeared, and the meniscus IM' is retracted inside the orifice OF. At the last step t9 the initial state at t0 is obtained by the ink supply.

From the foregoing explanation it will be understood that the form of the drive pulse supplied to the heating element H1 is an important factor for achieving stable emission of the recording liquid IK. Also the bubble contraction is an important factor governing the separation of the droplet, which however is easily controllable by the form of the drive pulse. Similarly the emission speed of the droplet and the emission frequency thereof are similarly controllable by the form of the drive pulses.

Figure 14:
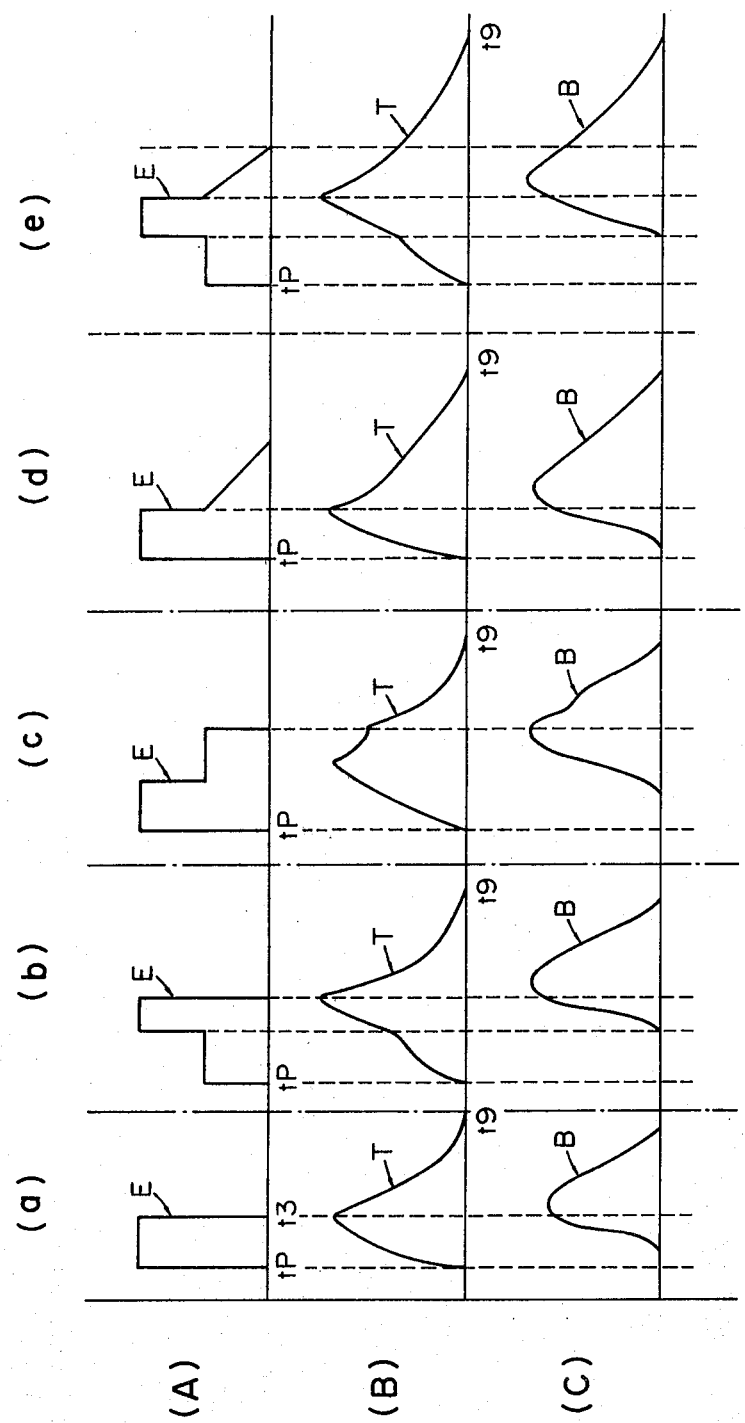
FIG. 14 is a waveform chart showing various drive waveforms.

FIGS. 14A, 14B and 14C respectively show various drive pulses and the corresponding temperature change in the heating element H1 and volume change of the bubble B.

In fact any of these drive pulses provides satisfactory droplet emission. The waveform (a) is advantageous in not requiring a high resistance in the CR discharge circuit as required in the piezo-drive system. The waveform (b) performs preheating in order to reduce the width of the main pulse, and is advantageous in achieving faster bubble development, faster emission speed and faster response frequency and in preventing troubles resulting from excessive heating of the recording liquid as it is preheated only at the recording.

The waveform (c) performs a post-heating after the main drive pulse in order to realize a further gradual retraction of the meniscus after the droplet is separated, thus avoiding air introduction into the ink chamber after droplet emission and ensuring succeeding droplet emission. Also in this case the bubble is completely annihilated to ensure succeeding droplet emission as the post-heating is conducted only at the recording operation. The waveform (d) achieves gradual heat dissipation for realizing smooth droplet separation and preventing excessive meniscus retraction, and is advantageous in realizing gradual meniscus retraction without sacrificing the droplet emission speed. The waveform (e) is also an effective drive pulse obtained by combining the waveforms (b) and (d).

In any of the foregoing waveforms the heat disspation of the heating element and the bubble contraction are achieved in a gradual manner simply by the control of the drive pulse without the use of external high resistors etc., and it is possible to prevent the failure of succeeding droplet emission resulting from air introduction from the orifice caused by the excessive meniscus retraction. The preferred development and contraction of the bubble are determined by the width S and amplitude L of the pulse. The waveform (a) is particularly preferable in consideration of the function of large-scale integrated circuits. Also the laser pulse has a waveform similar to (a). It is also quite easy to regulate the intensity of laser light thereby generating laser pulses of waveforms similar to (b) to (e) or controlling the quantity of heat or the volume of bubble.

Consequently the term "heating element" as hereinafter used will include other heat generating means such as laser light, infrared light etc.

Figure 15A:
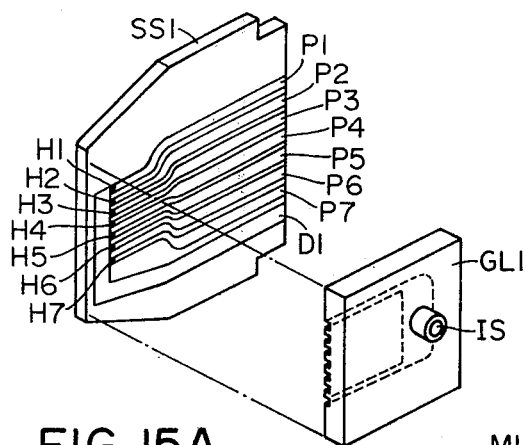
FIGS. 15A and 15B are schematic views showing the structure of the recording head.

FIG. 15A shows an embodiment of the head structure in an exploded perspective view, wherein a substrate SS1 is provided on the surface thereof with heating elements H1–H7, a common electrode D1 and selecting electrodes P1–P7. Said heating elements H1–H7 are of a same area and a same resistance and are provided respectively corresponding to liquid chambers. A plate GL1 is provided with an ink inlet IS for ink supply and with fine grooves M1–M7 constituting said liquid chambers and a common ink supply groove ND. At the ink emitting end face, said plate GL1 may be provided with an unrepresented orifice plate if necessary.

Said grooved plate GL1 is composed of a glass plate which is subjected to an etching process for forming said common ink supply groove ND and said grooves M1–M7 which constitute the liquid chambers upon adhesion with said substrate SS1 so as to respectively correspond to said heating elements.

Said heating elements H1–H7 selectively generate heat in response to external drive signals and with energy levels corresponding to the levels of said drive signals.

Figure 16A:
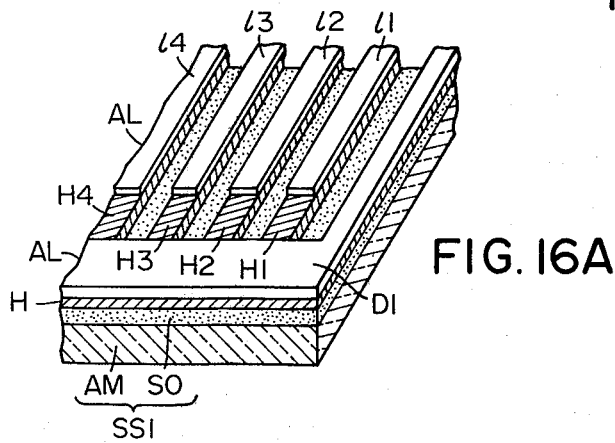
FIGS. 16A and 16B are a perspective view and a cross-sectional view showing a part of said recording head.
Figure 16B:
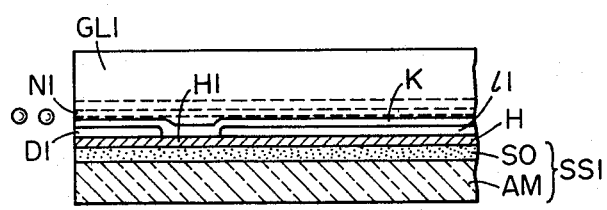

FIGS. 16A and 16B show the details of an embodiment of said substrate SS1 having the heating elements. As an example an alumina substrate AM was subjected to the formation, in succession, of an $SiO_2$ heat-accumulating layer SO (several microns), a $ZrB_2$ heating resistor layer H (800 Å) and an aluminum electrode layer AL (5000 Å), and a selective etching process was conducted to form heating elements H1, H2, H3 etc. each of 60$\mu$ in width and 75$\mu$ in length, and also to form selecting electrodes P1, P2, P3 etc. and the common electrode D1. As shown in FIG. 16B said heating elements and electrode layer AL were covered with an $SiO_2$ protective layer K of 1$\mu$ in thickness. The recording head prepared in this manner was used as a vertical 1×7 head as shown in FIG. 15A and mounted on the carriage CA shown in FIGS. 1 and 2. Said head provided satisfactory results under a drive similar to the aforementioned embodiment but without the CR time constant circuit required for piezo discharge.

Figure 17:
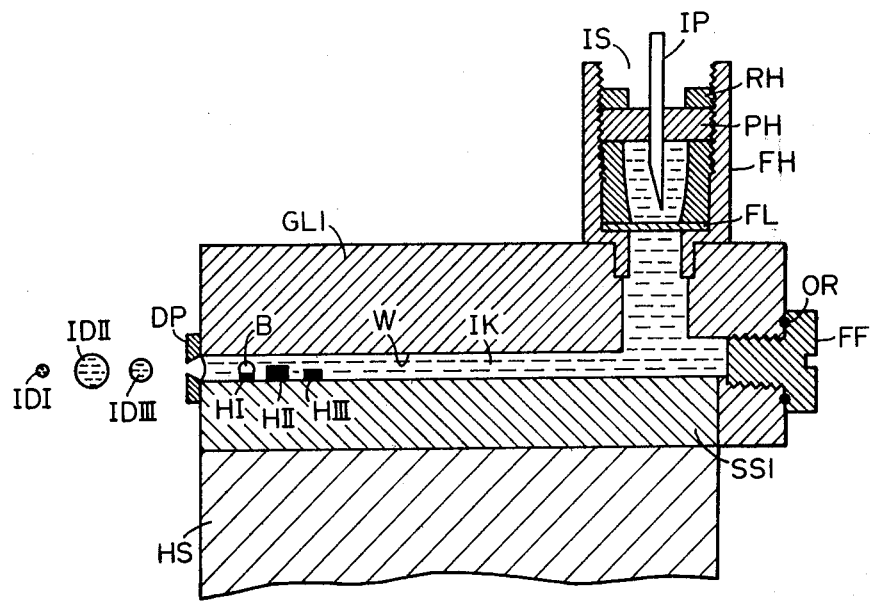
FIG. 17 is a cross-sectional view showing another embodiment of the recording head.

FIG. 17 shows the cross-sectional view of another embodiment which is basically similar to the foregoing embodiment but is provided with plural heating elements HI, HII and HIII for controlling tonal rendition.

Figure 15B:
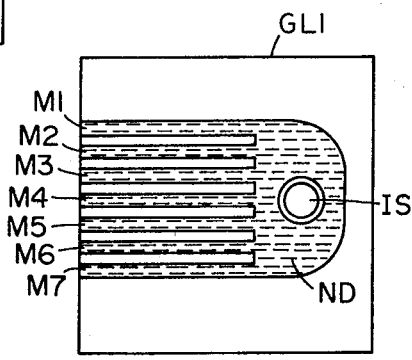

As shown in FIG. 17 the substrate SS1 having said heating elements HI, HII and HIII is mounted on a heat sink HS and is surfacially covered with a grooved plate GL1 to constitute a liquid chamber W at the interface between said substrate and grooved plate. Said grooved plate GL1 is further provided with an ink supply inlet IS and a stopper FF with an O-ring OR for eliminating bubbles at ink filling and for facilitating nozzle cleaning. The ink supply inlet IS is provided with a filter FL for removing fine dust, a filter holder block FH for supporting said filter, a pipe holding rubber member PH for supporting an ink supply pipe IP and a rubber holding member RH for supporting said rubber member. At the front end of the liquid chamber W there is mounted an orifice plate OP which is provided for the purpose of obtaining the droplets of desired form and may be dispensed with if the front end portion of the liquid chamber W itself is formed into an orifice as shown in FIGS. 15 and 16.

Along the longitudinal direction of the liquid chamber W there are arranged, as shown in a magnified manner, plural heating elements HI, HII and HIII which cause a state change in the neighboring ink by heat generation through selective signal supply. Said state change includes volumetric expansion of liquid and evaporation, which are collectively represented by a bubble B. Said bubble generation causes a volume change in the liquid chamber, leading to the emission of ink droplets IDI, IDII and IDIII from the orifice plate OP. Said droplets can be of different sizes by the tonal rendition control to be explained in the following. The heating elements HI, HII and HIII are formed with different areas or volumes to have different resistances, so that the bubbles generated in the liquid are different in size according to the applied energy and provide droplets of different sizes. A similar effect is also obtainable by selecting plural heating elements in succession or at the same time.

Figure 18:
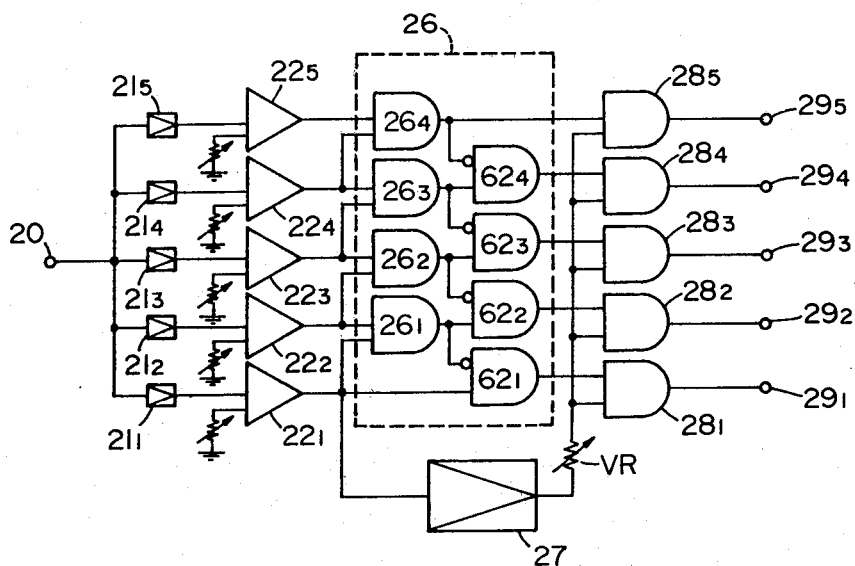
FIG. 18 is a circuit diagram of an embodiment of the drive circuit therefor.

In the following is explained an example of driving the recording head of the present embodiment. Reference is made to FIG. 18 showing a block diagram of a control circuit for selectively driving five heating elements, in which an analog input signal supplied from an input terminal 20 is introduced through buffer circuits $21_1$ to $21_5$ to comparators $22_1$ to $22_5$. The comparator $22_1$ is designed to release an output signal in response to a lowest input signal level, while other comparators $22_2$ to $22_5$ respond to successively higher input signal levels.

The output signal from said comparators are supplied to AND gates $26_1$ to $26_4$ to open only one gate in the gate circuit 26 corresponding to the input signal level. On the other hand a drive circuit 27 is activated by the output signal from the comparator $22_1$ and supplies an output pulse of desired width and amplitude to AND gates $28_1$–$28_5$, of which only one is opened by the output signal selected in said gate circuit 26 to transmit the output signal from said drive circuit 27 to one of the output terminals $29_1$–$29_5$. Assuming that said output terminals are respectively connected with heating elements of successively decreasing resistances, the element of highest resistance or lowest resistance is activated respectively corresponding to the highest or lowest input signal level. Also if the input signal is given by digital signals indicating the levels, it is possible to select the gate circuits according to the input digital signals without the aforementioned comparators and thus to drive the corresponding heating elements selectively. Also the heating elements of different resistances can also be obtained by employing different materials instead of employing different dimensions.

Figure 19:
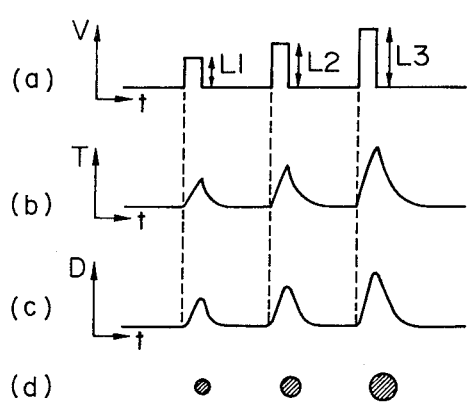
FIGS. 19 and 20 are waveform charts of drive signals therefor.
Figure 20:
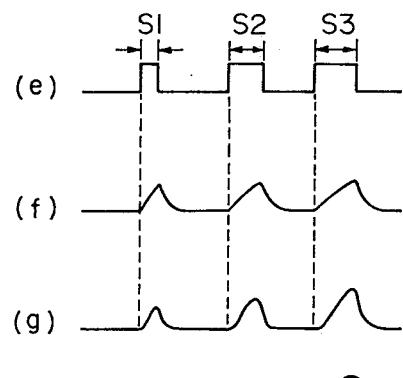

In contrast to the foregoing control on the size an ink droplet by selection of heating elements of different resistance, there will be explained in the following another method of tonal rendition control achieved by providing the heating element of a constant resistance with different drive pulses. It is found that the emitted droplet becomes larger when a heating element is given a pulse of a fixed width but with an increasing amplitude. Also the droplet becomes larger when the pulse width is increased while the peak temperature of the heating element is maintained constant. FIGS. 19 and 20 show these controlling methods. FIG. 19 illustrates the case of changing the pulse amplitude, in which (a), (b), (c) and (d) respectively represent the pulse waveform supplied to the heating element, surface temperature thereof, volume of bubble generated in the liquid and recorded dot obtained corresponding to the emitted droplet. Thus, with the increasing pulse amplitude L the surface temperature and thus the heating energy increase to generate a larger bubble, thus emitting a larger droplet. FIG. 20 shows a case of changing the pulse width S, wherein (e), (f), (g) and (h) respectively show the applied pulse waveforms, surface temperature of the heating element, volume of the generated bubble and dimension of the emitted droplet. Thus, when the pulse width is increased while the peak surface temperature is maintained constant, the generated bubble increases in volume correspondingly to result in a larger droplet. It is naturally possible to achieve high-speed emission of uniform droplets through appropriate regulation of the pulse width S and amplitude L. Also said rendition control can be conducted automatically in response to the density of the original to be recorded or copied, for example by supplying signals related to an original reading sensor to the input terminal 20 shown in FIG. 18, or by supplying to said terminal 20 a signal from a variable resistor linked with a manual density control dial. Also such tonal rendition control is similarly achievable with the laser pulses.

Furthermore it is easily possible to constantly obtain an optimum image in response to a time-dependent change of the recording liquid or to possible changes in the circumstances of the apparatus such as temperature or humidity, by controlling the bubble generation through various heat-generating or heat-controlling means.

Where the present embodiment is applied to a multi-color ink jet recording there is required appropriate bubble control for each color, and it is rendered possible to obtain uniform droplets of different colors through the aforementioned thermal pulse control.

Furthermore it is possible, through such bubble control, to obtain an intentionally modified color balance such as a reddish or bluish hue or an intentional density control.

Figure 21:
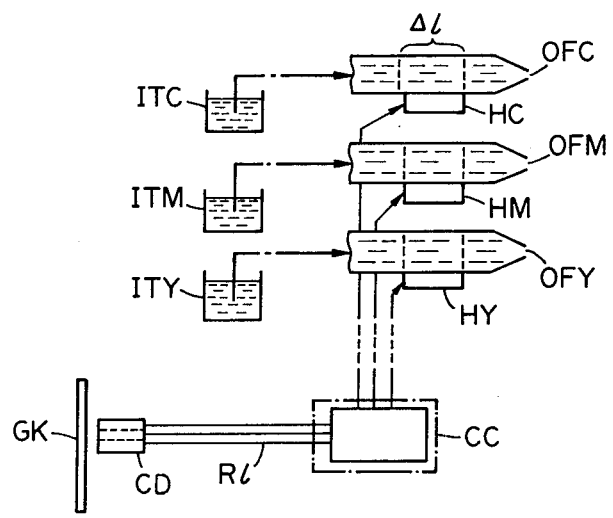
FIG. 21 is a schematic diagram showing the principle of a color recording.

FIG. 21 is a schematic view of a multi-color ink jet recording apparatus embodying the present invention. In the following explanation there are employed three color liquids C, M and Y as a representative example, but the present invention is by no means limited to such case but covers any combination of two or more colors.

In the apparatus shown in FIG. 21 there are provided, respectively corresponding to the liquids C, M and Y of different colors, ink supply tanks ITC, ITM and ITY, thermal action portions Al, thermal energy generating means HC, HM and HY and orifices OFC, OFM and OFY. There may be further provided additional thermal action portions, heating elements and orifices or each orifice may be provided with plural heating elements as explained in the foregoing. Each liquid flow path from the supply tank to the orifice contains only one liquid, but it may also be designed to accomodate a mixture of more than two liquids if desirable.

The thermal action portion Δl is provided for causing a state change in the color liquid by the thermal energy as explained in the foregoing.

Said thermal energy generating means HC, HM and HY may be composed of an electrothermal transducer such as a thermal element as employed in a thermal recording head, a Peltier element or a combination thereof, or high-energy irradiation such a laser beam explained in the foregoing.

Said means is positioned on the internal or external wall of said thermal action portion, or, in case of an irradiation such as the laser beam, provided in an appropriate position allowing the supply of thermal energy to the liquid in said thermal action portion.

Said thermal energy generating means are selectively driven by a control unit CC according the multi-color input signals. In case the apparatus of the present invention is utilized as a recording unit in a copier or a fascimile apparatus, there will be provided a sensor means CS composed of lenses, filters, photosensor elements etc. for receiving multi-color information from an original GK. Also in case said apparatus is utilized as an output terminal of a computer, said sensor means is dispensed with as the multicolor information is obtained from said computer.

Said control unit CC contains the means for selectively driving the thermal energy generating means according to the multi-color information, for example, in the case of driving electrothermal transducers with pulse signals, clock generators, shift registers, memories, drive circuits, synchronizing means for determining the relative displacing speed between the recording member and the recording head etc.

The quantity of heat generated by said thermal energy generating means can be easily controlled as explained in the foregoing through the regulation of the width and amplitude of the drive pulses.

The recording liquids are suitably selected according to the nature of the desired record, for example a graphic false-color recording, a true-color recording or a black-red two-colored recording for document or proof editing.

For example the graphic recording is utilized for recording multi-color information obtained from a computer with arbitrary colors.

In the case of true-color recording, the original information is converted into color-separation signals obtained by three photosensors respectively through red, green and blue filters, said signals being utilized for driving electrothermal transducers in the thermal action portions of the recording nozzles.

A particularly preferred result is obtained where the apparatus of the present invention is realized in a structure composed of a substrate having heating elements, a grooved plate, a liquid supply block etc. as will be explained in the following.

Figure 22A:
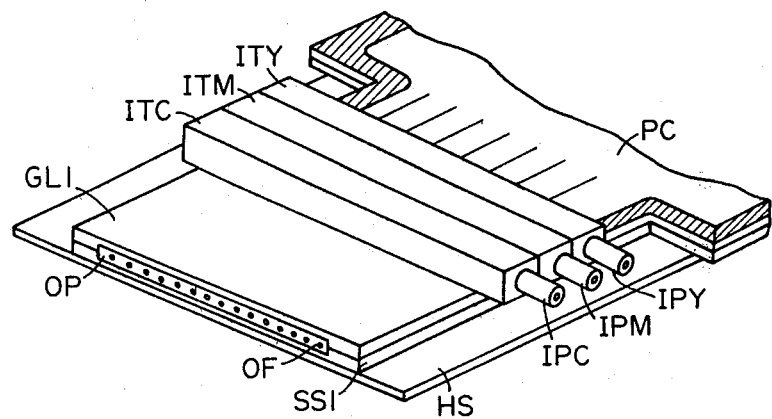
FIGS. 22A, 22B and 22C are schematic views showing the structure of the recording head therefor.

FIG. 22A shows, in a perspective view, an embodiment of a multi-color recording head composed of a substrate SS1 having heating elements, a grooved plate GL1 having liquid supply grooves, ink supply tanks ITC, ITM, ITY and ink supply pipes IPC, IPM, IPY for supplying multi-color recording liquids C, M and Y, a printed circuit board PC for supplying image signals etc. There may also be added a highly heat conductive heat sink plate HS and an orifice OP for forming desired orifices OF.

Figure 22B:
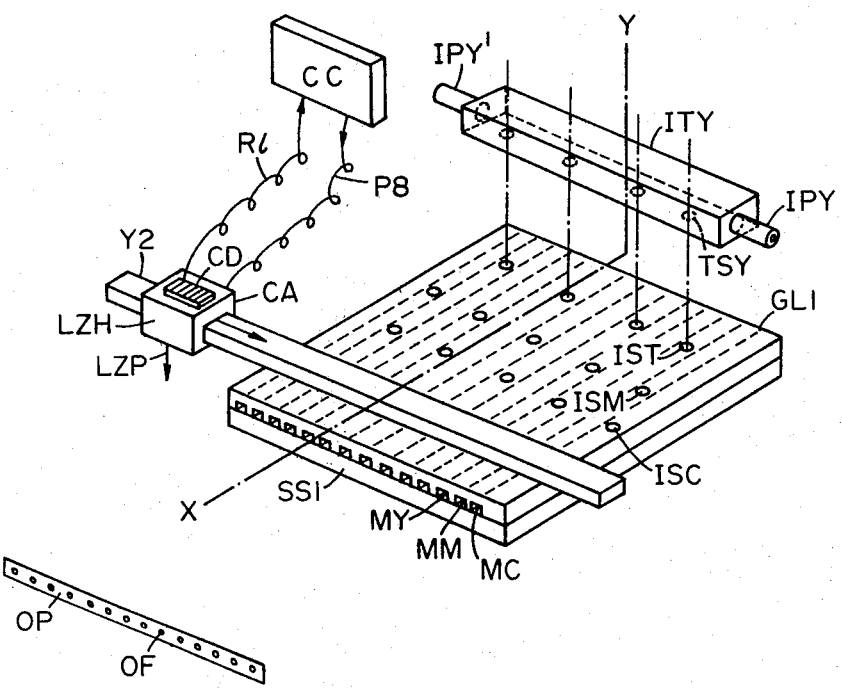
Figure 22C:
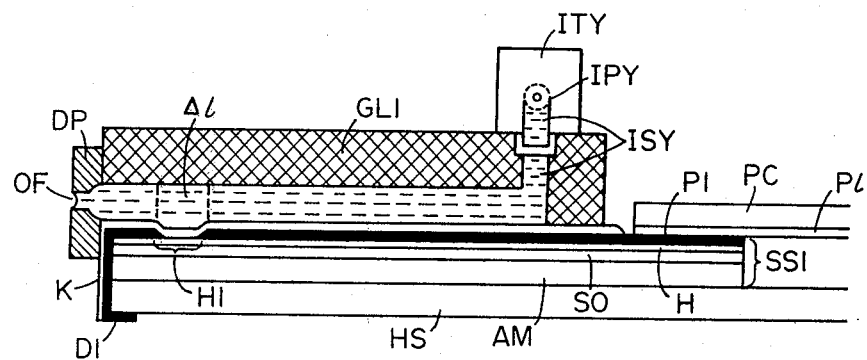

FIG. 22B shows the relation of the grooved plate and ink tanks shown in FIG. 22B, and FIG. 22C shows a cross section along the line X-Y in FIG. 22B. As shown in FIG. 22C the substrate SS1 is composed of a substrate AM composed for example of alumina and a heat-accumulating layer SO, on which are formed electrothermal transducers composed of heating elements H1 or $ZrB_2$ or $HfB_2$, selecting electrodes P1 and a common electrode D1 composed of aluminum. Further there is provided an $SiO_2$ protective layer K on the electrodes and on the lateral face of the orifices. As shown in FIG. 22B the grooved plate GL1 is composed of a plate of glass or a plastic material, on which formed are grooves MC, MM and MY for supplying multi-colored liquids formed by a diamond microcutter and liquid supply inlets ISC, ISM, ISY formed for example by the electron beam method respectively corresponding to the grooves of the same color. Also the ink tanks ITC, ITM and ITY are respectively provided with apertures in positions respectively corresponding to said inlets ISC, ISM and ISY. Although only one tank ITY is shown in FIG. 22B, other tanks ITC and ITM for the liquids or other colors C and M are mounted in a similar manner on the grooved plate GL1. The substrate, grooved plate and ink tanks are integrally assembled in such a manner that the heating elements respectively correspond to the grooves. IPY' indicates a bubble eliminating pipe for removing a bubble when filling the apparatus with liquid.

FIG. 22C, P1 indicates an electrode formed on the printed circuit board PC for driving the heating elements. The common electrode D1 is extended, as illustrated, to the lateral and lower faces of the substrate SS1 to facilitate the connection to said electrode.

Such structure enables an easy implementation of a multiorifice array having orifices for multiple colors arranged with a high density. In a multi-colored image composed of a plurality of dots, it is generally accepted that the deterioration in the tonal reproduction or the color aberration becomes evident if the positional aberration of dots exceeds 150–170μ, but the apparatus of the present invention is extremely advantageous in achieving satisfactory resolution and tonal rendition as the orifices can be arranged at a density of 10 lines/mm or even higher and will operates within the above-mentioned limit. Also said array is advantageous in a highly compact structure with an extremely small thickness.

It is to be noted that the density of the orifices should be correlated for each pixel with the density of the photosensors in the photosensor means. For this reason, in the case of a natural color recording with three liquids and with an orifice density of 12 lines/mm, there will be required a density of photosensor elements on the order of 4 lines/mm.

In case such a multi-orifice array is utilized for a recording apparatus such as a copier or a facsimile apparatus, the use of a linear photosensor array as the photosensor means is advantageous in achieving a high-resolution recording with a high speed by a single scanning operation. Such an arrangement is further advantageous in that the control unit can be simplified without any particular delay circuits or memories and in that the multi-orifice array is easy to prepare.

Also said photosensor means CS can be mounted on the laser head LZH slidably displaceable on a guide member Y2 as shown in FIG. 22B, in which case the synchronized information reading and recording are simultaneously conducted during the displacing motion by the linear motor. In this manner it is rendered possible to economize the circuit and also to realize a compact recording apparatus of a simplified structure.

The recording head illustrated in FIG. 22B was mounted, as a vertical 1×n recording head, on the carriage CA shown in FIGS. 1 and 2 and utilized in recording operation with high-speed displacement in the lateral direction to obtain a high-density image.

As an example, the apparatus shown in FIG. 22 was prepared in the following manner. An alumina substrate SS1 of 0.6 mm in thickness was provided with a sputtered $SiO_2$ layer (3μ), a $ZrB_2$ heating resistor layer (800 Å) and an aluminum layer (5000 Å) for forming the electrodes P1 and D1, and a photoetching process was conducted to produce 1200 heating elements H1 each having a resistance of 200Ω and a dimension of 50μ in width and 300μ in length at a pitch of 111μ. Successively $SiO_2$ was sputtered in a thickness of 1μ to form a protection layer K thereby completing the electrothermal transducers.

Successively a grooved plate GL1 having grooves of 60μ in width and in depth at a pitch of 111μ (corresponding to a pitch of 9 lines/mm) was formed with a microcutter on a glass plate and glass ink tanks ITC, ITM and ITY were adhered onto said substrate SS1 in the aforementioned manner, and an aluminum heat sink HS was adhered to the opposite face of said substrate.

In this manner a recording head having 1200 orifices, at a density of 9 lines/mm, including 400 orifices for each ink of cyan, magenta or yellow color filling the ink tanks ITC, ITM or ITY was prepared.

Said recording head was combined with photosensor means, control unit etc. and was utilized in recording with image signal pulses of cyan, magenta and yellow supplied to the heating elements while liquids were supplied with such a pressure as to not cause emission of the liquids from the orifices in the absence of said image signal pulses. There was obtained a color image excellent in resolution and in tonal rendition with a very high recording speed, but the color was not well balanced in that the gray area obtained by the superposed cyan, magenta and yellow inks was somewhat yellowish. Also the density of the entire image was slightly deficient. For this reason variable resistors VRC, VRM and VRY shown in FIG. 23 were regulated so as to provide a pulse width of 15 μsec for cyan and magenta and 10 μsec for yellow. In this manner it was rendered possible to obtain a satisfactorily neutral gray color and to achieve an increased image density.

The recording conditions in the above-explained experiment are summarized in Tab. 1:

TABLE 1

| Drive voltage | 35 V |
|---|---|
| Frequency | 5 kHz |
| Recording material | Bond paper (Seven Stars; A-size 28.5 kgs.; Hokuetsu Paper) |

TABLE 1-continued

| Inks | | | |
|---|---|---|---|
| (Y) | Yellow | Yellow RY (Orient Chemical) | 2.0 gr. |
| | | ethanol | 80.0 gr. |
| | | diethylene glycol | 18.0 gr. |
| (M) | Magenta | Red BT | 3.0 gr. |
| | | ethanol | 80.0 gr. |
| | | diethylene glycol | 17.0 gr. |
| (C) | Cyan | Blue RL | 2.0 gr. |
| | | ethanol | 80.0 gr. |
| | | diethylene glycol | 18.0 gr. |

Figure 23:
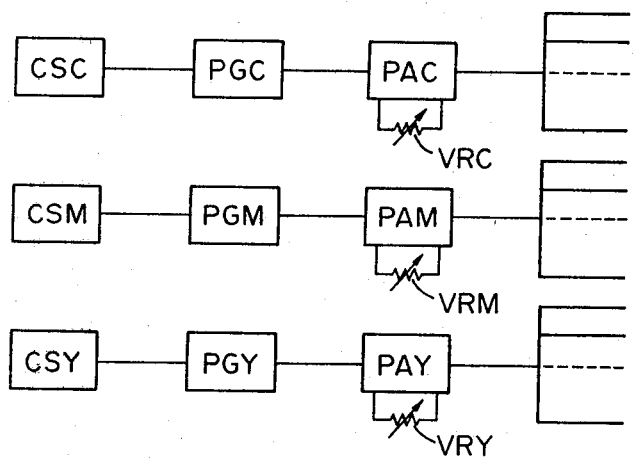
FIG. 23 is a diagram showing an embodiment of the drive circuit therefor.

In the circuit shown in FIG. 23, CSC, CSM and CSY are circuits containing sensors, analog-digital converters etc. for the respective colors. PGC, PGM and PGY are pulse generators for generating drive pulses in response to the output signals from said circuits CSC, CSM and CSY. PAC, PAM and PAY are amplifiers for said output pulses, and VRC, VRM and VRY are variable resistors for controlling the width and amplitude of said output pulses.

As explained in the foregoing example the optimum thermal pulses or bubbles for inks containing different dyes as shown in Tab. 1 can be obtained by appropriate regulation of the variable resistors VRC, VRM and VRY. Naturally said variable resistors can be automatically controlled for example by the signals related to the original reading sensors or by the facsimile signals.

It is also possible to achieve a similar control by suitably regulating the laser outputs for different colors instead of said variable resistors.

What we claim is:

1. A recording apparatus, comprising:
   linear motor means;
   a recording head driven by said linear motor means and having plural recording means;
   a first position being the rest position of said recording head;
   a second position being adapted to reverse a running direction of said recording head and being located closer to a printing field as comparing with the location of said first position to the printing field;
   means for applying a recording instruction signal to said recording head; and
   means for causing said recording head to rest at said first position in the absence of a recording instruction signal from said applying means and to reverse the running direction of said recording head at said second position in the presence of the succeeding recording instruction signal.

2. A recording apparatus according to claim 1, wherein the detection of the position and the speed of said recording head is conducted by a single signal generating member.

3. A recording apparatus according to claim 1, wherein said recording head comprises ink jet nozzle means.

4. A recording apparatus according to claim 3, further comprising means for protecting said ink jet nozzle means in said first position.

* * * * *

UNITED STATES PATENT OFFICE
CERTIFICATE OF CORRECTION

Patent No. 4,313,684    Dated February 2, 1982

Inventor(s) SHIGEMITSU TAZAKI, ET AL.

It is certified that error appears in the above-identified patent and that said Letters Patent are hereby corrected as shown below:

Column 2, line 68, "return" should read --returned--.

Column 3, line 14, "magnetid" should read --magnetic--

Column 5, line 2, "mentione" should read --mentioned--;
 line 38, "States" should read --Stated--.

Column 15, line 67, after "size" insert --of--.

Column 18, line 10, "or" (first occurrence) should read --of--
 line 47, "operates" should read --operate--.

Signed and Sealed this

Twentieth Day of July 1982

[SEAL]

*Attest:*

GERALD J. MOSSINGHOFF

*Attesting Officer*    *Commissioner of Patents and Trademarks*